US010192363B2

(12) United States Patent
Lanier et al.

(10) Patent No.: US 10,192,363 B2
(45) Date of Patent: Jan. 29, 2019

(54) MATH OPERATIONS IN MIXED OR VIRTUAL REALITY

(71) Applicant: Microsoft Technology Licensing, LLC, Redmond, WA (US)

(72) Inventors: Jaron Lanier, Berkeley, CA (US); Andrzej Banburski, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 15/394,517

(22) Filed: Dec. 29, 2016

(65) Prior Publication Data

US 2018/0061132 A1    Mar. 1, 2018

Related U.S. Application Data

(60) Provisional application No. 62/380,476, filed on Aug. 28, 2016.

(51) Int. Cl.
| | |
|---|---|
| G09G 5/00 | (2006.01) |
| G06T 19/00 | (2011.01) |
| G06F 3/01 | (2006.01) |

(52) U.S. Cl.
CPC ............ *G06T 19/006* (2013.01); *G06F 3/013* (2013.01)

(58) Field of Classification Search
CPC .................................................. G06T 19/006
See application file for complete search history.

(56) References Cited

U.S. PATENT DOCUMENTS

| | | |
|---|---|---|
| 6,842,175 B1 | 1/2005 | Schmalstieg et al. |
| 8,717,360 B2 | 5/2014 | Vesely et al. |
| 2004/0104935 A1 | 6/2004 | Williamson et al. |
| 2009/0187389 A1 | 7/2009 | Dobbins et al. |

(Continued)

OTHER PUBLICATIONS

Looser et al., An Evaluation of Virtual Lenses for Object Selection in Augmented Reality, Graphite '07 Proceedings of the 5th International Conference on Computer Graphics and Interactive Techniques in Australia and Southeast Asia, Dec. 2007, pp. 203-210.*

(Continued)

*Primary Examiner* — Charles Tseng
(74) *Attorney, Agent, or Firm* — Schwegman Lundberg & Woessner, P.A.

(57) ABSTRACT

Techniques described herein include graphically representing mathematical functions or operators in a mixed or virtual reality display device. The graphical representations may be moved around in a virtual reality space that includes displayed source material, such as data. If the graphical representations are located along a line of sight from a virtual location of a user of the mixed or virtual reality display device to the displayed source data, then the mathematical functions or operators represented by the graphical representations are applied to the displayed source data. Results may be displayed on the graphical representation virtually located closest to the virtual location of the user. Techniques described herein allow for simultaneous collaboration among mixed or virtual reality display devices of multiple users interacting with the graphical representations in the virtual reality space.

18 Claims, 15 Drawing Sheets

(56) References Cited

U.S. PATENT DOCUMENTS

| | | | |
|---|---|---|---|
| 2010/0238161 A1* | 9/2010 | Varga | G06T 17/05 345/419 |
| 2011/0063286 A1 | 3/2011 | Roberts et al. | |
| 2012/0105473 A1* | 5/2012 | Bar-Zeev | G02B 27/017 345/633 |
| 2014/0282220 A1* | 9/2014 | Wantland | G06F 3/04845 715/782 |
| 2015/0193979 A1 | 7/2015 | Grek | |

OTHER PUBLICATIONS

Jusufi et al., The Network Lens: Interactive Exploration of Multivariate Networks Using Visual Filtering, 2010 14th International Conference Information Visualisation, Jul. 2010, pp. 35-42.*

Aguerreche, et al., "A Comparison of Three Interactive Techniques for Collaborative Manipulation of Objects in Virtual Reality", In Proceedings of Computer Graphics International, Jun. 8, 2010, 4 pages.

Billinghurst et al., "Designing Augmented Reality Interfaces", in the Journal of the ACM SIGGRAPH Computer Graphics-Learning through computer-generated visualization, vol. 39, Iss. 1, Feb. 2005, pp. 17-22.

Brudy, "Interactive Menus in Augmented Reality Environments", in the Proceedings of the Media Informatics Advanced Seminar 'Beyond the Desktop', 2013, 8 pages.

Kato, et al., "Virtual Object Manipulation on a Table-Top AR Environment", In Proceedings of IEEE and ACM International Symposium on Augmented Reality, Oct. 5, 2000, 9 pages.

Kaufmann, "Collaborative Augmented Reality in Education", In Publication of Vienna University of Technology, Feb. 3, 2003, 4 pages.

Kaufmann, et al., "Learning Objects for Education With Augmented Reality", In Proceedings of European Distance and E-Learning Network, Jun. 14, 2006, 6 pages.

Kaufmann, "Virtual Environments for Mathematics and Geometry Education", In Publication of Themes in Science and Technology Education, vol. 2, Issue 1-2, Jan. 18, 2011, pp. 131-152.

LaVoila, "From Research to Games: Interacting with 3D Space", retrieved on Aug. 29, 2016, available at: <<http://www.gamasutra.com/view/feature/4331/from_research_to_games_.php?print=1>>, Gamasutra, Apr. 27, 2010, 9 pages.

Moeslund, et al., "The ARTHUR System: An Augmented Round Table", in the Journal of Virtual Reality and Broadcasting, retrieved on Aug. 29, 2016, 6 pages.

Zhang, et al., "Social Interactions in Multiscale CVEs", In Proceedings of 4th International Conference on Collaborative Virtual Environments, Sep. 30, 2002, 8 pages.

* cited by examiner

1400 ⤴

```
RECEIVE, FROM A FIRST CLIENT DEVICE, A REQUEST TO SHARE A VIRTUAL
CONTENT ITEM WITH ONE OR MORE OTHER DEVICES
1402
          │
          ▼
SEND COMMAND TO ONE OR MORE OTHER CLIENT DEVICES
1404
          │
          ▼
CAUSE THE VIRTUAL CONTENT ITEM TO BE PRESENTED VIA THE ONE OR MORE
OTHER CLIENT DEVICES
1406
```

FIG. 14

MATH OPERATIONS IN MIXED OR VIRTUAL REALITY

PRIORITY APPLICATION

This application claims the benefit of and priority to U.S. Provisional Patent Application No. 62/380,476, filed on Aug. 28, 2016, titled "Holomath", which is incorporated herein by reference.

BACKGROUND

Computing systems can help generate new environments including virtual reality environments and/or mixed reality environments. Virtual reality is an immersive experience, which simulates physical presence in a real or imagined environment. For example, a virtual reality environment can immerse a physical, real-world person with computer-generated graphics in a computer-generated, virtual scene via a virtual reality display device. Mixed reality, which can also be known as augmented reality, is a hybrid reality experience, which merges real worlds and virtual worlds. Mixed reality is a technology that produces mixed reality environments where a physical, real-world person and/or objects in physical, real-world scenes co-exist with virtual, computer-generated people and/or objects in real time. For example, a mixed reality environment can augment a physical, real-world scene and/or a physical, real-world person with computer-generated graphics in the physical, real-world scene viewed via a mixed reality display device.

Co-located and/or remotely located users can communicate via virtual reality or mixed reality technologies. Various additional and/or alternative technologies are available to enable remotely located users to communicate with one another. For instance, remotely located users can communicate via visual communication service providers that leverage online video chat, online voice calls, online video conferencing, remote desktop sharing, etc.

SUMMARY

Techniques described herein include graphically representing mathematical functions or operators in a mixed reality display device. The graphical representations may be moved around in a virtual reality space that includes displayed source material, such as data. If the graphical representations are located along a line of sight from a virtual location of a user of the mixed reality display device to the displayed source data, then the mathematical functions or operators represented by the graphical representations are applied to the displayed source data. Results may be displayed on the graphical representation virtually located closest to the virtual location of the user. Techniques described herein allow for simultaneous collaboration among mixed reality display devices of multiple users interacting with the graphical representations in the virtual reality space.

It should be appreciated that the above-described subject matter can be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of techniques in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 14 is a flow diagram that illustrates an example process to cause the visibility of virtual content to be modified in a mixed reality environment.

DETAILED DESCRIPTION

Figure 1:
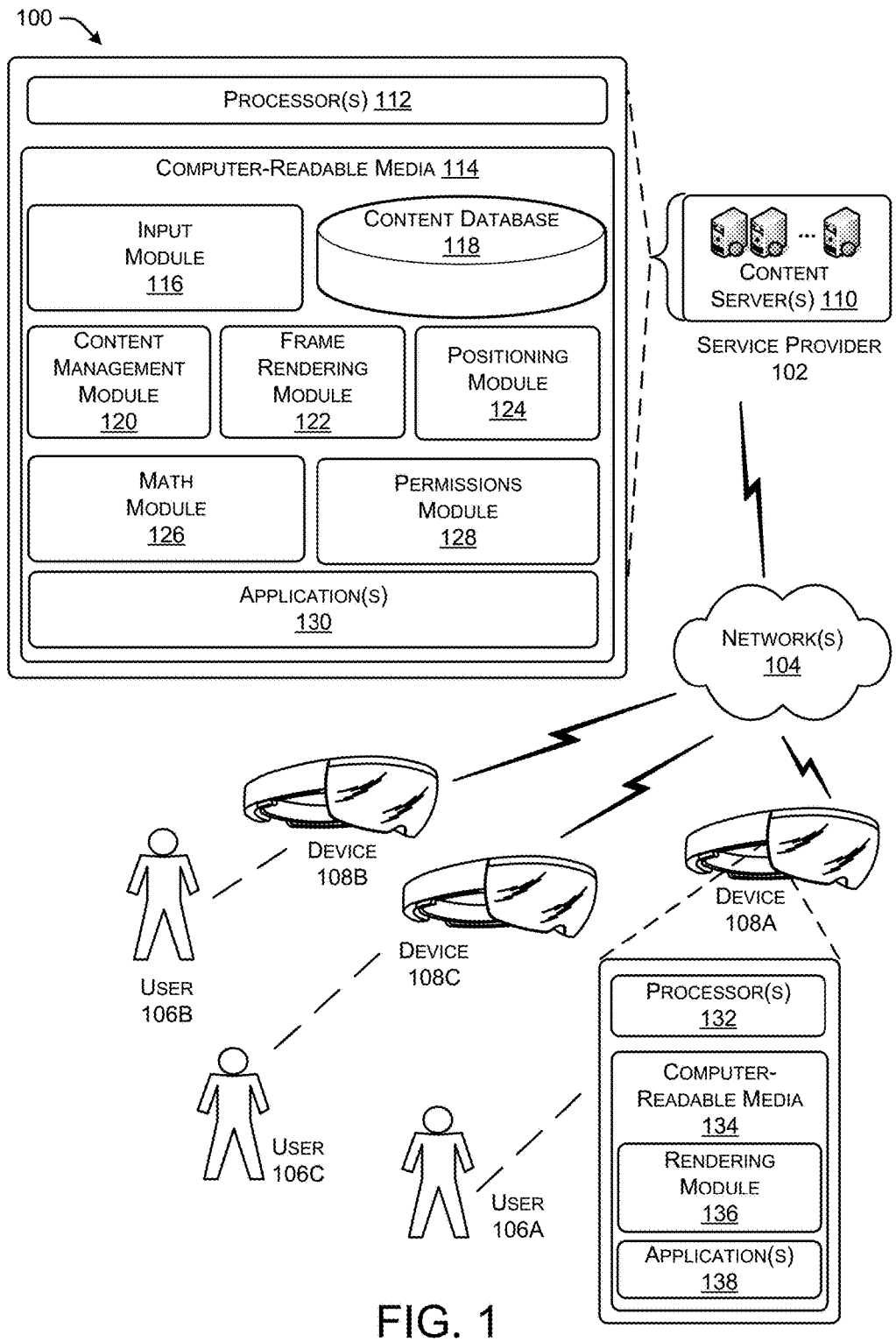
FIG. 1 is a schematic diagram showing an example environment for enabling two or more users in a mixed reality environment to interact with one another and/or with virtual content that is presented in the mixed reality environment.

This disclosure describes techniques for enabling two or more users in a mixed reality environment to collaborate with one another and/or with virtual content that is presented in the mixed reality environment. The techniques described herein can enhance mixed reality collaborations between users in mixed reality environments. In at least one example, the techniques are directed to mixed reality social collaborations between two or more users who are physically located in a same real scene, as described below, and the real scene is unmarked (i.e., lacking predetermined and/or machine vision-specific markings for directing interactions between the two or more users). The techniques described herein can have various applications, including but not limited to, enabling users that are located in a same real scene to share virtual content and/or interact with the virtual content in a mixed reality environment via mixed reality display devices. The techniques described herein enable enhanced user interfaces to be presented on displays of mixed reality devices thereby enhancing mixed reality collaborations between users and the mixed reality experience.

For the purposes of this discussion, physical, real-world objects ("real objects") or physical, real-world people ("real people" and/or "real person") describe objects or people, respectively, that physically exist in a physical, real-world scene ("real scene") associated with a mixed reality display. Real objects and/or real people can move in and out of a field of view based on movement patterns of the real objects and/or movement of a user and/or user device. Virtual, computer-generated content ("virtual content" and/or "content items") can describe content that is generated by one or more computing devices to supplement the real scene in a user's field of view. In at least one example, virtual content can include one or more pixels each having a respective color or brightness that are collectively presented on a display such to represent a person, object, etc. that is not physically present in a real scene. That is, in at least one example, virtual content can include graphics that are representative of objects ("virtual objects"), people ("virtual people" and/or "virtual person"), biometric data, effects, etc. Virtual content can include two dimensional graphics, three dimensional objects, content associated with applications, etc. Virtual content can be rendered into the mixed reality environment via techniques described herein. In additional and/or alternative examples, virtual content can include computer-generated content such as sound, video, global positioning system (UPS), etc.

Mixed reality experiences offer different opportunities to affect self-perception and new ways for communication to occur. The techniques described herein enable users to interact with one another and/or with virtual content in mixed reality environments using mixed reality devices. In at least one example, the techniques described herein can enable conversational partners to share virtual content and/or interact with virtual content in mixed reality environments. While the techniques described herein are directed to mixed reality environments, as described above, mixed reality may also be known as augmented reality. Accordingly, the techniques described herein should not be construed to exclude augmented reality environments.

In various examples described herein, a mixed or virtual reality system may incorporate any of a variety of math programs or applications that host math functions or operators, such as MAPLE®, WOLFRAM MATHEMATICA® (hereinafter "Mathematica") or any symbolic mathematical computation program, and EXCEL®, just to name a few examples. Such examples may be described by the term "HoloMath," which may be considered a framework for mathematical collaboration in a mixed or virtual reality. Math functions or operators may be visually (e.g., virtually) represented in a display of a mixed or virtual reality system. Moreover, the functions or operators may be visually applied to source material, such as tabulated or graphical data, and results of such application may be displayed in the mixed or virtual reality system. Such a system may allow multiple collaborators, who may be located remotely from one another, to simultaneously look at the same results and explore structure of various similar functions or operators collaboratively.

In particular examples, HoloMath may be capable of allowing visualization of discrete two-dimensional (2D) data sets and functions, mathematical operations on the above, represented by lenses that users can look through to obtain results. Additionally, HoloMath may be capable of combining two or more functions to obtain a result depending on a chosen algebraic operation, for example, and if an operation is non-commutative, HoloMath may allow for looking from opposing sides to give opposing results, and creation of three-dimensional (3D) tensor networks and their contractions.

In a 3D world of a display of a mixed or virtual reality system, elements of a mathematical expression (e.g., one or more functions and/or operators (including tensors)) may be represented by 3D virtual objects. In some examples, the 3D virtual objects are virtual lenses, which may be positioned so that as a user of the mixed or virtual reality system looks along a sight line through one or more of the virtual lenses toward displayed source material, the user may observe the source material modified by the virtual lenses. In this case, each of the virtual lenses may represent a respective function or operator. Accordingly, these functions or operators are applied to the source material if the sight line intersects these virtual lenses.

As a user virtually moves around in the 3D world, the user's sight line to the source material changes so that various virtual lenses move in or out of the sight line. As this occurs, different functions or operators may be alternately applied to the source material, based on which virtual lenses are intersected by the sight line at a particular time. Multiple users, which may be located remotely from one another, may simultaneously interact with such virtual lenses in the 3D world. Thus, individual users may have respective lines of sight so that each user may see results of different (or the same) functions or operators applied to the source material. In this fashion, collaborating users may explore a space of different alternatives in a meta-structure of mathematical expressions, for example.

In particular examples, the user interface in HoloMath may be a "Toolkit," which a user can make appear or disappear by saying "Toolkit," for example. The Toolkit may appear virtually by default at some distance (e.g., about four feet) in front of the user, and the user can reposition the Toolkit by gazing at a center cube and air tapping, just to described a specific example. Depending on the settings, these actions may make the Toolkit follow the user's gaze or hand position. To stop such movement or placement, the user may air tap again.

The Toolkit may have two panes of buttons—the left pane may have mathematical options, while the right pane may hold various input tools, as well as Help and Settings menu, for example.

The actions of different buttons on the right pane include, but are not limited to, Settings, Move Tool, Selection Tool, Remove Tool, Evaluation Tool, etc. A Settings tool (e.g., a cog wheel) may be used to bring up the Settings Menu, in which the user can change the HoloMath Server IP address and connect to this address. The user can also choose whether the Move tool uses the gaze or hand position. Move Tool (e.g., arrows) may enable movement of objects on air tap. Move Tool may follow either the user's gaze or hand position, depending on the option chosen in Settings menu, for example. Selection Tool may allow the selection of multiple objects. Remove Tool (e.g., trash bin) may be used to delete objects on air tap. Evaluation Tool (e.g., calculator) may be used to evaluate tensor contraction.

The buttons on the left pane may create mathematical objects. Transformation button (e.g., magnifying lens) may be used to create a virtual lens with a mathematical operation. Looking through the lens at a data set (e.g., source material), the user can see the data set transformed by the operation associated with the lens. Several example options are presented, as well as the option to create a custom lens. To create a custom lens, a user may use a naming convention such as from Mathematical. Data Sets (e.g., which may be represented by colored bars) may be used to create a visualization of a discrete data set. Some examples have 2-D domains and are represented by both their matrix plots, which can be placed on walls, as well as 3D plots placed in front. To create a custom data set, a user may use, for example, the Mathematica language conventions and provide the name of the data set used in the command defining it. Function button (e.g., which may be represented by a colored curved surface) may allow for the definition of a mathematical function. A user can specify the name, but this is not necessary. Functions of two or more variables can be plotted. Tensor button (e.g., which may be represented by a cake with candles on both sides) may be used to create an abstract tensor. A user may choose from a set of predefined choices regarding such a tensor. Once one or more tensors are in a scene, a user can click on the nodes on their covariant or contravariant legs to perform contractions. To evaluate the resulting contraction, the user may either click the Evaluation Tool on the Toolkit, or say "evaluate contraction."

Gestures and user input may be performed by any of a number of techniques. Selection of different Toolkit options as well as objects may be performed by airtapping the options or objects once, for example. In some cases, by default, the movement of 3D objects may be set to follow the user's gaze, but an option in the Settings menu (e.g., top-rightmost button in the Toolkit) may allow movement to follow hand position. In this latter case, to stop movement, the user may gaze at the object being moving and air tap to place it. To perform rotations around a vertical axis, the user may first air tap an object (with the movement tool selected), then pinch and move a hand left to right. In some examples, HoloMath allows the use of a physical BLUETOOTH® keyboard, in place of the virtual one.

In some examples, voice commands may be used as input. In the following, words in quotes represent spoken words. For example, "toolkit" or "tools" toggles the appearance of the Toolkit in the scene. "Node placement" toggles the mode of placing graph nodes at hand position on air tapping. Saying "node placement" again may stop this action before air tapping anything else to avoid placing unnecessary nodes. These nodes can be connected with each other to form graphs, by air tapping two different nodes in turn. "Evaluate contraction" or "compute" may be used to evaluate tensor contraction.

In various examples, Holomath may be implemented with or without a separate server. For example, Holomath may be run on either a single headset or be distributed on headsets of those sharing the experience.

Descriptions above (e.g., tools, implementations, etc.) are non-limiting examples and additional or alternative tools or implementations may be used.

Illustrative Environments

FIG. 1 is a schematic diagram showing an example environment 100 for enabling two or more users in a mixed reality environment to interact with one another and with virtual content that is presented in the mixed reality environment. More particularly, the example environment 100 can include a service provider 102, one or more networks 104, one or more users 106 (e.g., user 106A, user 106B, user 106C, etc.) and one or more devices 108 (e.g., device 108A, device 108B, device 108C, etc.) associated with the one or more users 106 (e.g., user 106A, user 106B, user 106C, etc.).

The service provider 102 can be any entity, server(s), platform, console, computer, etc., that facilitates two or more users 106 interacting in a mixed reality environment to enable individual users (e.g., user 106A, user 106B, and/or user 106C) of the two or more users 106 to interact with one another and/or with virtual content in the mixed reality environment. The service provider 102 can be implemented in a non-distributed computing environment or can be implemented in a distributed computing environment, possibly by running some modules on devices 108 or other remotely located devices. As shown, the service provider 102 can include one or more server(s) 110, which can include one or more processing unit(s) (e.g., processor(s) 112) and computer-readable media 114, such as memory. In various examples, the service provider 102 can access, receive, and/or determine authentication data from a device (e.g., device 108A), access content data associated with virtual content items, send rendering data associated with individual virtual content items to the device (e.g., device 108A), and cause the individual virtual content items to be presented on a display associated with the device (e.g., device 108A). For the purpose of this discussion, rendering data may include instructions for rendering a graphical representation of a virtual content item via a display of a device (e.g., device 108A). For instance, the rendering data may include instructions describing the geometry, viewpoint, texture, lighting, shading, etc. associated with a virtual content item. In some examples, the service provider 102 may send rendering data to devices 108 and the devices 108 can render the graphical representations via displays associated with the devices. In other examples, as described below, the service provider 102 may render frames and may send the frames to the devices 108 for presentation via the displays.

In some examples, the service provider 102 can receive frame requests from a device (e.g., device 108A) and can send frame messages to the device (e.g., device 108A) to mitigate latency caused by movement that occurs between sending the frame requests to the service provider 102 and receiving frame messages at and/or rendering corresponding frames via the device (e.g., device 108A). In at least one example, the service provider 102 can receive requests from individual devices (e.g., device 108A, device 108B, device 108C, etc.) of the one or more devices 108 associated with sharing virtual content items with other devices 108 (e.g., a request to view and/or access a virtual content items) and/or requests for performing interactions on the virtual content items, and the service provider 102 can synchronize communications and/or content rendering between the devices 108 to ensure that the virtual content items and interactions directed to the virtual content items are presented to corresponding users 106 at a substantially same time so that each of the users 106 has a same experience.

In some examples, the networks 104 can be any type of network known in the art, such as the Internet. Moreover, the devices 108 can communicatively couple to the networks 104 in any manner, such as by a global or local wired or wireless connection (e.g., local area network (LAN), intranet, Bluetooth, etc.). The networks 104 can facilitate communication between the server(s) 110 and the devices 108 associated with the one or more users 106.

Examples support scenarios where device(s) that can be included in the one or more server(s) 110 can include one or more computing devices that operate in a cluster or other clustered configuration to share resources, balance load, increase performance, provide fail-over support or redundancy, or for other purposes. Device(s) included in the one or more server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (Milts), set-top boxes, cameras, integrated components for inclusion in a computing device, appliances, or any other sort of computing device.

Device(s) that can be included in the one or more server(s) 110 can include any type of computing device having one or more processing unit(s) (e.g., processor(s) 112) operably connected to computer-readable media 114 such as via a bus, which in some instances can include one or more of a system bus, a data bus, an address bus, a PCI bus, a Mini-PCI bus, and any variety of local, peripheral, and/or independent buses. Executable instructions stored on computer-readable media 114 can include, for example, an input module 116, a content database 118, a content management module 120, a frame rendering module 122, a positioning module 124, a math module 126, a permissions module 128, and one or more applications 130, and other modules, programs, or applications that are loadable and executable by the processor(s) 112.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Device(s) that can be included in the one or more server(s) 110 can further include one or more input/output (I/O) interface(s) coupled to the bus to allow device(s) to communicate with other devices such as input peripheral devices (e.g., a keyboard, a mouse, a pen, a game controller, a voice input device, a touch input device, gestural input device, a tracking device, a mapping device, an image camera, a time-of-flight (TOF) camera, a depth sensor, a physiological sensor, and the like) and/or output peripheral devices (e.g., a display, a printer, audio speakers, a haptic output, and the like). Such network interface(s) can include one or more network interface controllers (NICs) or other types of transceiver devices to send and receive communications over a network. For simplicity, some components are omitted from the illustrated environment.

Processing unit(s) (e.g., processor(s) 112) can represent, for example, a CPU-type processing unit, a GPU-type processing unit, an HPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs). System-on-a-chip systems (SOCs), Complex Programmable Logic Devices (CPLDs), etc. In various examples, the processing unit(s) (e.g., processor(s) 112) can execute one or more modules and/or processes to cause the server(s) 110 to perform a variety of functions, as set forth above and explained in further detail in the following disclosure. Additionally, each of the processing unit(s) (e.g., processor(s) 112) can possess its own local memory, which also can store program modules, program data, and/or one or more operating systems.

In at least one configuration, the computer-readable media 114 of the server(s) 110 can include components that facilitate interaction between the service provider 102 and the one or more devices 108. The components can represent pieces of code executing on a computing device. For example, the computer-readable media 114 can include the input module 116, the content database 118, the content management module 120, the frame rendering module 122, the positioning module 124, the math module 126, the permissions module 128, and the one or more applications 130, etc. In at least some examples, the modules can be implemented as computer-readable instructions, various data structures, and so forth via at leak one processing unit(s) (e.g., processor(s) 112) to enable two or more users 106 in a mixed reality environment to interact with one another and with virtual content that is presented in the mixed reality environment. Functionality to perform these operations can be included in multiple devices or a single device.

Depending on the exact configuration and type of the server(s) 110, the computer-readable media 114 can include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

The input module 116 is configured to receive input from one or more devices 108 (e.g., device 108A, device 108B, device 108C, etc.) each corresponding to a user (e.g., user 106A, user 106B, user 106C, etc.). In at least one example, the input module 116 can access, receive, and/or determine authentication data from a device (e.g., device 108A). The authentication data can correspond to a user identification and password associated with a user (e.g., user 106A) associated with the device (e.g., device 108A), biometric identification associated with a user (e.g., user 106A) associated with the device (e.g., device 108A), etc. In at least one example, the authentication data can be leveraged to determine presence of corresponding devices 108 in a mixed reality environment. For the purpose of this discussion, presence may indicate that a device (e.g., device 108A) is located in and/or interacting with other devices (e.g., device 108B, device 108C, etc.) and/or virtual content in a mixed reality environment.

In additional and/or alternative examples, the authentication data can be utilized to determine virtual content items that are available to the user (e.g., user 106A) and the user's (e.g., user 106A) permissions corresponding to viewing and/or interacting with each of the virtual content items. In at least one example, the authentication data can be utilized for causing virtual content items to be presented in a same mixed reality environment where a user (e.g. user 106A) previously left the virtual content item and in a same position where the user (e.g., user 106A) previously left the virtual content item (e.g., if a user (e.g., user 106A) removes his or her head mounted display device (e.g., device 108A), turns off his or her device (e.g., device 108A), etc.).

The content database 118 is configured to store content data associated with virtual content. Content data associated with the individual virtual content items can be stored in the content database 118. Each individual virtual content item can be associated with data indicating an owner identification, a content identification, and permissions (i.e., permissions data). Data associated with an owner of a virtual content item may identify a user (e.g., user 106A, user 106B, user 106C, etc.) that generated and/or has control over the permissions associated with a virtual content item. That is, an owner of a virtual content item can correspond to a user (e.g., user 106A, user 106B, user 106C, etc.) that generated and/or has control over the permissions associated with the virtual content item. Content identification can correspond to data indicating the content associated with the virtual content item. Permissions data can include information indicating which users 106 and/or corresponding devices 108 have permission to view and/or interact with the virtual content in the mixed reality environment (i.e., which users 106 the owner has shared the virtual content with). For instance, the permission data can reflect whether a virtual content item is public, private, visible by some devices (e.g., device 108A, device 108B, and/or device 108C), etc. Additionally and/or alternatively, the permissions data can indicate which interactions particular users 106 can perform and/or which interactions particular users 106 are prohibited from performing. In some examples, the permissions data can be based on input from the owner of the corresponding virtual content item, as described below.

In at least one example, the user (e.g., user 106A) associated with a device (e.g., device 108A) that initially requests the virtual content item can be the owner of the virtual content item such that he or she can modify the permissions associated with the virtual content item. In at least one example, the owner of the virtual content item can determine which other users (e.g., user 106B and/or user 106C) can view the virtual content item (i.e., whether the virtual content item is visible to the other users 106). For instance, in an example, an owner of a virtual content item can utilize a menu (e.g., a dropdown menu, a radial menu, etc.) or other mechanisms to share the virtual content item with all users 106 in a same mixed reality environment (i.e., make the virtual content item public), share the virtual content item with some users (e.g., user 106A, user 106B, and/or user 106C) in the same mixed reality environment, or not share the virtual content item with any other users 106 (i.e., make the virtual content item private). That is, in some examples, the owner of the virtual content item can determine whether a virtual content item is visible or not visible via other devices 108. In other examples, the owner of the virtual content item can determine which other users (e.g., user 106B and/or user 106C) can interact with the virtual content item via corresponding devices (e.g., device 108B and/or device 108C) and/or which interactions are permitted.

The content management module 120 manages the ownership of virtual content items and can leverage the permissions data to determine which of the other users (e.g., user 106B and/or user 106C) and/or corresponding devices (e.g., device 106B and/or user 106C) have permission to view individual virtual content items and/or interact with individual virtual content items. That is, the content management module 120 may access the content data to determine devices 108 with which a content item has been shared and/or interactions available for each of the devices 108. As described above, the content data may include permissions data which indicates whether a content item is public, private, or has been shared with one or more devices (e.g., device 108B, device 108C, etc.) and/or interactions available for each of the devices 108.

In various examples, the frame rendering module 122 can receive frame request messages from a requesting device (e.g., device 108A) of the one or more devices 108. Frame request messages can include, but are not limited to, pose information associated with each eye of a user (e.g., user 106A), a timestamp, a desired resolution, and a desired field of view. Pose information can include a position and a rotation relative to a common coordinate system (i.e., a coordinate system that is consistently defined for both the device (e.g., device 108A) and the service provider 102), which for the purpose of this discussion, may be referred to as the worldspace coordinate system. A time stamp may represent a time in which the frame request message was generated and/or sent. A desired resolution may be a desired level of detail associated with rendered virtual content (i.e., a higher resolution amounts to more detail in the virtual content). In some examples, resolution can describe a pixel count in a digital image. A desired field of view may describe an extent to which the observable world is desired to be seen at any given time through a display of a mixed reality display device (e.g., device 108A, device 108B, device 108C, etc.). In some examples, field of view may describe an angle of view.

The frame request message can be processed by the frame rendering module 122 to enable virtual content to be rendered from a particular user's point of view (e.g., user 106A). The frame rendering module 122 may generate a frame message responsive to a frame request message. The resulting frame message can include a same timestamp which was sent in the associated frame request message, the determined resolution, the determined field of view, the pose of each eye as sent in the associated frame request message, and the render distance. In some examples, the frame rendering module 122 can be configured to render stereo images (one image per eye of a user (e.g., user 106A)) for each frame request message. The stereo images may represent frames. A first image of the stereo images can correspond to the left eye of a user (e.g., user 106A) and a second image of the stereo images can correspond to a right eye of a user (e.g., user 106A). In at least one example, a frame message may include rendered stereo images. In some examples, the frame rendering module 122 can render a mixed reality scene at a different resolution or field of view than the requested desired values. The resulting resolution and/or field of view may be associated with the frame message, described above. The frame rendering module 122 can send the frame message to the requesting device (e.g., device 108A).

The requesting device (e.g., device 108A) can receive the frame message, process the received frame message, and render the stereo images as two quads, or other virtual surfaces, positioned in worldspace in front of a virtual stereo camera associated with the requesting device (e.g., device 108A). In an example, the left stereo image can be textured onto the left quad and the right stereo image can be textured onto the right quad. In such an example, the left quad may be rendered by a left camera associated with a device (e.g., device 108A) and the right quad may be rendered by a right camera associated with a device (e.g., device 108A). Each quad can be positioned in worldspace in front of each eye as specified in the frame message, such that each quad's normal vector is aligned with the eye direction vector. Each quad can be sized such that it can fill the frustum defined by each eye in the received frame message, which can be defined by the combination of the determined field of view and the eye pose information in the frame message. The requesting device (e.g., device 108A), can continue to render both the left and right quads as the user (e.g., user 106A) moves about in worldspace (with the quads fixed in worldspace), until the next frame request message is sent to the frame rendering module 122 and the responsive frame message is received by the requesting device (e.g., device 108A). Based at least in part on receiving the next frame message, the left and right quads can be repositioned and retextured as described according to the data in the frame message (e.g., a same timestamp which was sent in the associated frame request message, the determined resolution, the determined field of view, the pose of each eye as sent in the associated frame request message, and the render distance).

Before the next frame message is received by the requesting device (e.g., 108A), any movement of the user (e.g., user 106A), and corresponding device (e.g., device 108A), relative to the left and right quads (which are fixed in worldspace) can appear as a corresponding and opposite movement of the left and right quads in screenspace (e.g., relative to the screen). For the purpose of this discussion, screenspace can represent the space defined by the display 204 associated with a device (e.g., device 108A). For each frame message, there can be an infinite number of possible valid positions and sizes for the left and right quads defined by a proportional relationship between the worldspace distance from each quad to each eye and the worldspace size of each quad (i.e., the further away these quads are, the larger they may be in order to fill each eye frustum appropriately). The amount of movement in screenspace can be proportionately affected by the distance at which these quads are positioned relative to the user (e.g., user 106A) (i.e., the parallax effect).

To create more natural movement of these quads in screenspace (between frame messages) the distance of these quads (from their associated eye positions) can be determined by using a heuristic to approximate an appropriate distance of the quads. An example of a heuristic can be to calculate the average distance of each virtual object which is visible in the rendered frame. Another example can be to calculate the average distance of each pixel that is visible in the frame rendering module 122. An additional and/or alternative example can be to calculate the distance of the most salient object (or the most salient pixels) in the scene (as determined by any number of factors, including gaze tracking). The frame rendering module 122 can use any of these (or any other) heuristics to calculate a render distance for each frame, which can also be sent in each frame message. This render distance can then be used to define a specific position and size at which the requesting device (e.g., device 108A) can position the left and right quads.

In at least one example, to calculate an average pixel distance, the frame rendering module 122 can render a depth buffer for each frame from a center eye anchor (i.e., the center between both eyes of a user (e.g., user 106A)). In the at least one example, the depth buffer can be rendered using a shader that outputs the pixel depth mapped to a value between 0 and 1 (linearly or otherwise), with 0 being the camera's near plane, and 1 being the camera's far plane. As a non-limiting example, a depth value can be encoded either into one (8-bit) channel of the output buffer, such that the depth value is encoded with a resolution of 255 values (1 byte), or alternatively all four channels in a 32-bit buffer can be leveraged to encode a 32-bit floating point value representing the same depth value (between 0 and 1) at 32-bit precision for each pixel. In the non-limiting example, the resulting depth buffer values (once decoded into a standard 32-bit floating point representation) can be used to determine the worldspace distance between each pixel and the camera which was used to render the depth buffer. In the non-limiting example, the worldspace distance for each pixel is determined by subtracting the near plane distance from the far plane distance, multiplying that difference by the pixel's depth value, and then adding the near plane distance to the result. The frame rendering module 122 can then calculate an average pixel distance by averaging the worldspace distance of each pixel. This average pixel distance can be included in the frame message as the render distance.

In some examples, the frame rendering module 122 may send the depth buffer data in the frame message to the requesting device (e.g., device 108A) and a parallax shader can be used by the requesting device (e.g., device 108A) to approximate movement of the user (e.g., user 106A). In such examples, the frame message may include additional and/or alternative data (e.g., the depth buffer, either for each eye, or for the center eye anchor), and the rendering module 136 may render the virtual content items in the mixed reality environment. In such examples, the frame rendering module 122 may not calculate the average pixel distance and/or a saliency map, as described above.

In at least some examples, the frame rendering module 122 may access the content data to determine which virtual content items a user (e.g., user 106A) has open and/or which virtual content items the user (e.g., user 106A) has shared with other users (e.g., user 106B and/or user 106C).

The positioning module 124 can send instructions associated with rendering virtual content on a display of a device (e.g., device 108A) to the device (e.g., device 108A). That is, the positioning module 124 can send instructions associated with a position and/or placement of virtual content in a mixed reality environment. The instructions can be determined by the content data, and in some examples, may be associated with the rendering data, described below.

Math module 126 may access any of a number of math functions, math operators, graphical operators, or various types of expressions (single term or multi-term) from memory (e.g., content database 118) or from applications on a network or on the Cloud, for example. Such applications may be math programs or applications that host math functions or operators, such as Wolfram Mathematica®, Maple®, and Excel®, just to name a few examples.

Math module 126 may interface with other applications through, for a specific example, a protocol called Wolfram Symbolic Transfer Protocol (WSTP). In the case of Mathematica, such a protocol may allow communication between the Mathematica kernel and front-end, and may also provide a general interface between the kernel and other applications. In some examples, a Java program may ask Mathematica (or any other math-type application or executable code) to perform computations. Similar functionality may be achieved with .NET /Link, but with .NET programs instead of Java programs. Other languages that connect to Mathematica include Haskell, AppleScript, Racket, Visual Basic, Python, and Clojure, just to name a few specific examples.

Math module 126 may associate the math functions, math operators, graphical operators, or various types of expressions with respective virtual objects. The associations may be mapped by unique identifiers that are stored in the database 118, for example.

Permissions module 128 is configured to determine whether an interaction between a first user (e.g., user 106A) and the second user (e.g., user 106B) is permitted, authorizations associated with individual users (e.g., user 106A, user 106B, user 106C, etc.), etc. In at least one example, the permissions module 128 can store permissions data corresponding to instructions associated with individual users 106. The instructions can indicate what interactions that a particular user (e.g., user 106A, user 106B, or user 106C) permits another user (e.g., user 106A, user 106B, or user 106C) to have with the particular user (e.g., user 106A, user 106B, or user 106C) and/or view of the particular user (e.g., user 106A, user 106B, or user 106C). Additionally and/or alternatively, permission data can indicate types of information (e.g., metadata) a particular user (e.g., user 106A, user 106B, or user 106C) is permitted to see. The permissions data can be mapped to unique identifiers that are stored in the database 118, described below.

Applications (e.g., application(s) 130) are created by programmers to fulfill specific tasks. For example, applications (e.g., application(s) 130) can provide utility, entertainment, educational, and/or productivity functionalities to users 106 of devices 108. Applications (e.g., application(s) 130) can be built into a device (e.g., telecommunication, text message, clock, camera, etc.) or can be customized (e.g., games, news, transportation schedules, online shopping, etc.). Application(s) 130 can provide conversational partners (e.g., two or more users 106) various functionalities, including but not limited to, sharing and/or interacting with virtual content items in a mixed reality environment. In at least some examples, the virtual content items can be applications and/or can be associated with the applications.

In some examples, the one or more users 106 can operate corresponding devices 108 (e.g., user devices) to perform various functions associated with the devices 108. Device(s) 108 can represent a diverse variety of device types and are not limited to any particular type of device. Examples of device(s) 108 can include but are not limited to mobile computers, embedded computers, or combinations thereof. Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital signal processors, or any other sort of processing device, or the like. In at least one example, the devices 108 can include mixed reality devices (e.g., CANON® MREAL® System, MICROSOFT® HOLOLENS®, etc.). Mixed reality devices can include one or more sensors and a mixed reality display, as described below in the context of FIG. 2. In FIG. 1, device 108A, device 108B, and device 108C are wearable computers (e.g., head mount devices); however, the devices 108 can be any other device as described above. In at least one example, the devices 108 can be untethered such that they are not physically connected to external devices. However, the devices 108 can be communicatively coupled to external devices, as described herein.

Device(s) 108 can include one or more input/output (I/O) interface(s) coupled to the bus to allow device(s) to communicate with other devices such as input peripheral devices (e.g., a keyboard, a mouse, a pen, a game controller, a voice input device, a touch input device, gestural input device, a tracking device, a mapping device, an image camera, a depth sensor, a physiological sensor, and the like) and/or output peripheral devices (e.g., a display, a printer, audio speakers, a haptic output, and the like). As described above, in some examples, the I/O devices can be integrated into the one or more server(s) 110 and/or other machines and/or devices 108. In other examples, the one or more input peripheral devices can be communicatively coupled to the one or more server(s) 110 and/or other machines and/or devices 108. The one or more input peripheral devices can be associated with a single device (e.g., MICROSOFT® KINECT®, INTEL® Perceptual Computing SDK 2013, LEAP MOTION®, etc.) or separate devices.

Figure 2:
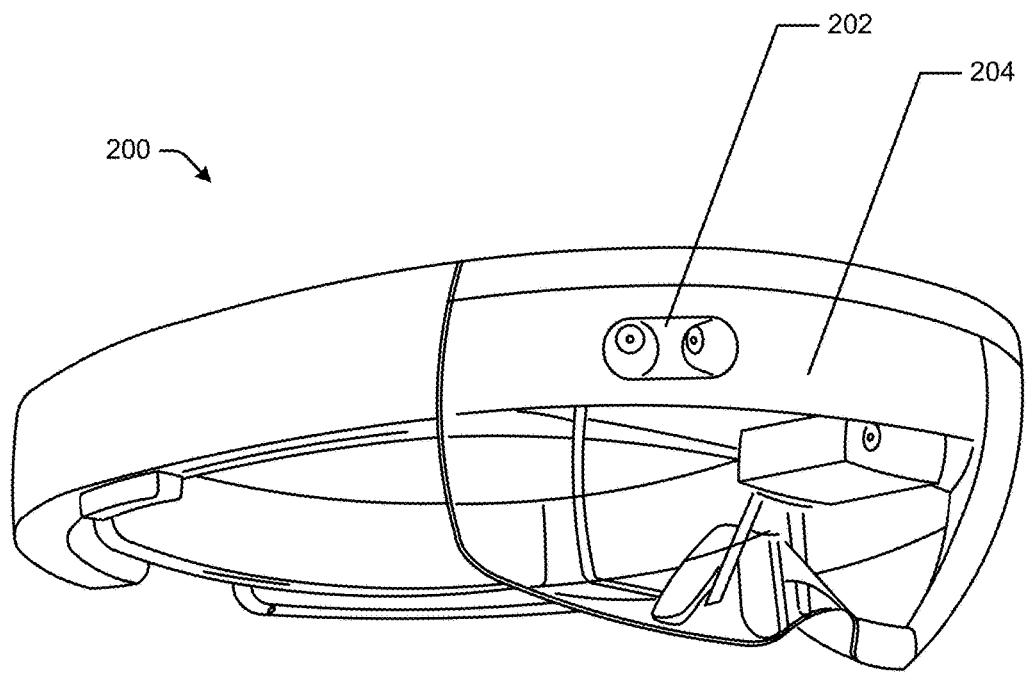
FIG. 2 is a schematic diagram showing an example of a head mounted mixed reality display device.

FIG. 2 is a schematic diagram showing an example of a head mounted mixed reality display device 200. As illustrated in FIG. 2, the head mounted mixed reality display device 200 can include one or more sensors 202 and a display 204. The one or more sensors 202 can reconstruct the real scene in which the one or more users 106 are physically located and track real people and/or objects within the real scene. The one or more sensors 202 can include cameras and/or sensors. The cameras can include image cameras, stereoscopic cameras, trulight cameras, etc. The sensors can include depth sensors, color sensors, acoustic sensors, optical sensors, pattern sensors, gravity sensors, etc. The cameras and/or sensors can output streams of data in substantially real time. The data can include moving image data and/or still image data (e.g., tracking data) representative of movement of real people and/or real objects in a real scene that is observable by the cameras and/or sensors. Additionally, the data can include depth data.

Tracking devices can output the moving image data and/or still image data (e.g., tracking data) representative of movement of real people and/or real objects in a real scene. Tracking devices can include optical tracking devices (e.g., VICON®, OPTITRACK®), magnetic tracking devices, acoustic tracking devices, gyroscopic tracking devices, mechanical tracking systems, depth cameras (e.g., KINECT®, INTEL® RealSense, etc.), inertial sensors (e.g., INTERSENSE®, XSENS, etc.), combinations of the foregoing, etc. The tracking devices can output streams of volumetric data, skeletal data, perspective data, etc. in substantially real time. The streams of volumetric data, skeletal data, perspective data, etc. can be received by the input module 116 in substantially real time. Volumetric data can correspond to a volume of space occupied by a body of a user (e.g., user 106A, user 106B, or user 106C). Skeletal data can correspond to data used to approximate a skeleton, in some examples, corresponding to a body of a user (e.g., user 106A, user 106B, or user 106C), and track the movement of the skeleton over time. The skeleton corresponding to the body of the user (e.g., user 106A, user 106B, or user 106C) can include an array of nodes that correspond to a plurality of human joints (e.g., elbow, knee, hip, etc.) that are connected to represent a human body. Perspective data can correspond to data collected from two or more perspectives that can be used to determine an outline of a body of a user (e.g., user 106A, user 106B, or user 106C) from a particular perspective.

Combinations of the volumetric data, the skeletal data, and the perspective data can be used to determine body representations corresponding to users 106. The body representations can approximate a body shape of a user (e.g., user 106A, user 106B, or user 106C). That is, volumetric data associated with a particular user (e.g., user 106A), skeletal data associated with a particular user (e.g., user 106A), and perspective data associated with a particular user (e.g., user 106A) can be used to determine a body representation that represents the particular user (e.g., user 106A). The body representations can be used by the rendering module 136 to determine where to render virtual content in the three dimensional coordinate system (e.g. worldspace) corresponding to the real space where the particular user (e.g., user 106A) is physically located.

The depth data can represent distances between real objects in a real scene observable by sensors and/or cameras and the sensors and/or cameras. The depth data can be based at least in part on infrared (IR) data, trulight data, stereoscopic data, light and/or pattern projection data, gravity data, acoustic data, etc. In at least one example, the stream of depth data can be derived from IR sensors (e.g., time of flight, etc.) and can be represented as a point cloud reflective of the real scene. The point cloud can represent a set of data points or depth pixels associated with surfaces of real objects and/or the real scene configured in a three dimensional coordinate system (e.g., worldspace). The depth pixels can be mapped into a grid. The grid of depth pixels can indicate a distance between real objects in the real scene and the cameras and/or sensors. The grid of depth pixels that correspond to the volume of space that is observable from the cameras and/or sensors can be called a depth space. The depth space can be utilized by the rendering module 136 (in the devices 108) for determining how to render virtual content in the mixed reality display.

In some examples, the one or more sensors 202 can be integrated into the head mounted mixed reality display device 200 and/or devices 108. In such examples, the one or more sensors 202 correspond to inside-out sensing sensors; that is, sensors that capture information from a first person perspective. In additional or alternative examples, the one or more sensors can be external to the head mounted mixed reality display device 200 and/or devices 108. In such examples, the one or more sensors 202 can be arranged in a room (e.g., placed in various positions throughout the room), associated with a device, etc. Such sensors can correspond to outside-in sensing sensors; that is, sensors that capture information from a third person perspective. In yet another example, the sensors can be external to the head mounted mixed reality display device 200 but can be associated with one or more wearable devices configured to collect data associated with the user (e.g., user 106A, user 106B, or user 106C).

The display 204 can present visual content to the one or more users 106 in a mixed reality environment. In some examples, the display 204 can present the mixed reality environment to a user (e.g., user 106A) in a spatial region that occupies an area that is substantially coextensive with the user's (e.g., user 106A) actual field of vision. In other examples, the display 204 can present the mixed reality environment to the user (e.g., user 106A) in a spatial region that occupies a lesser portion of a user's (e.g., user 106A) actual field of vision. The display 204 can include a transparent display that enables a user (e.g., user 106A) to view the real scene where he or she is physically located. Transparent displays can include optical see-through displays where the user (e.g., user 106A) sees the real scene he or she is physically present in directly, video see-through displays where the user (e.g., user 106A) observes the real scene in a video image acquired from a mounted camera, etc. The display 204 can present the virtual content to the user (e.g., user 106A) such that the virtual content augments the real scene where the user (e.g., user 106A) is physically located within the spatial region.

The virtual content can appear differently to different users (e.g., user 106A, user 106B, and/or user 106C) based on the users' perspectives and/or the location of the corresponding devices (e.g., device 108A, device 108B, and/or device 108C). For instance, the size of a virtual content item can be different based on a proximity of a user (e.g., user 106A, user 106B, and/or user 106C) and/or device (e.g., device 108A, device 108B, and/or device 108C) to the virtual content item. Additionally or alternatively, the shape of the virtual content item can be different based on the vantage point of a user (e.g., user 106A, user 106B, and/or user 106C) and/or device (e.g., device 108A, device 108B, and/or device 108C). For instance, a virtual content item can have a first shape when a user (e.g., user 106A, user 106B, and/or user 106C) and/or device (e.g., device 108A, device 108B, and/or device 108C) is looking at the virtual content item straight on and can have a second shape when a user (e.g., user 106A, user 106B, and/or user 106C) and/or device (e.g., device 108A, device 108B, and/or device 108C) is looking at the virtual item from the side.

The devices 108 can include one or more processing unit(s) (e.g., processor(s) 132), computer-readable media 134, at least including a rendering module 136 and one or more applications 138. The one or more processing unit(s) (e.g., processor(s) 132) can represent same units and/or perform same functions as processor(s) 112, described above. Computer-readable media 134 can represent computer-readable media 114 as described above. Computer-readable media 134 can include components that facilitate interaction between the service provider 102 and the one or more devices 108. The components can represent pieces of code executing on a computing device, as described above. Computer-readable media 134 can include at least a rendering module 136. The rendering module 136 can receive content data from the service provider 102 and can render virtual content items on the display 204 of the device (e.g., device 108A, device 108B, or device 108C). In at least one example, the rendering module 136 can leverage a standard graphics rendering pipeline for rendering virtual content on the display 204. In some examples, the rendering module 136 can receive previously rendered frames (e.g., associated with frame messages) from the service provider 102 to correct for potential latency and/or render correct perspectives based on the position of the user (e.g., user 106A) in worldspace. In other examples, the rendering module 136 may receive rendering data for rendering the virtual content items locally. Application(s) 138 can correspond to same applications as application(s) 130 or different applications.

Figure 3:
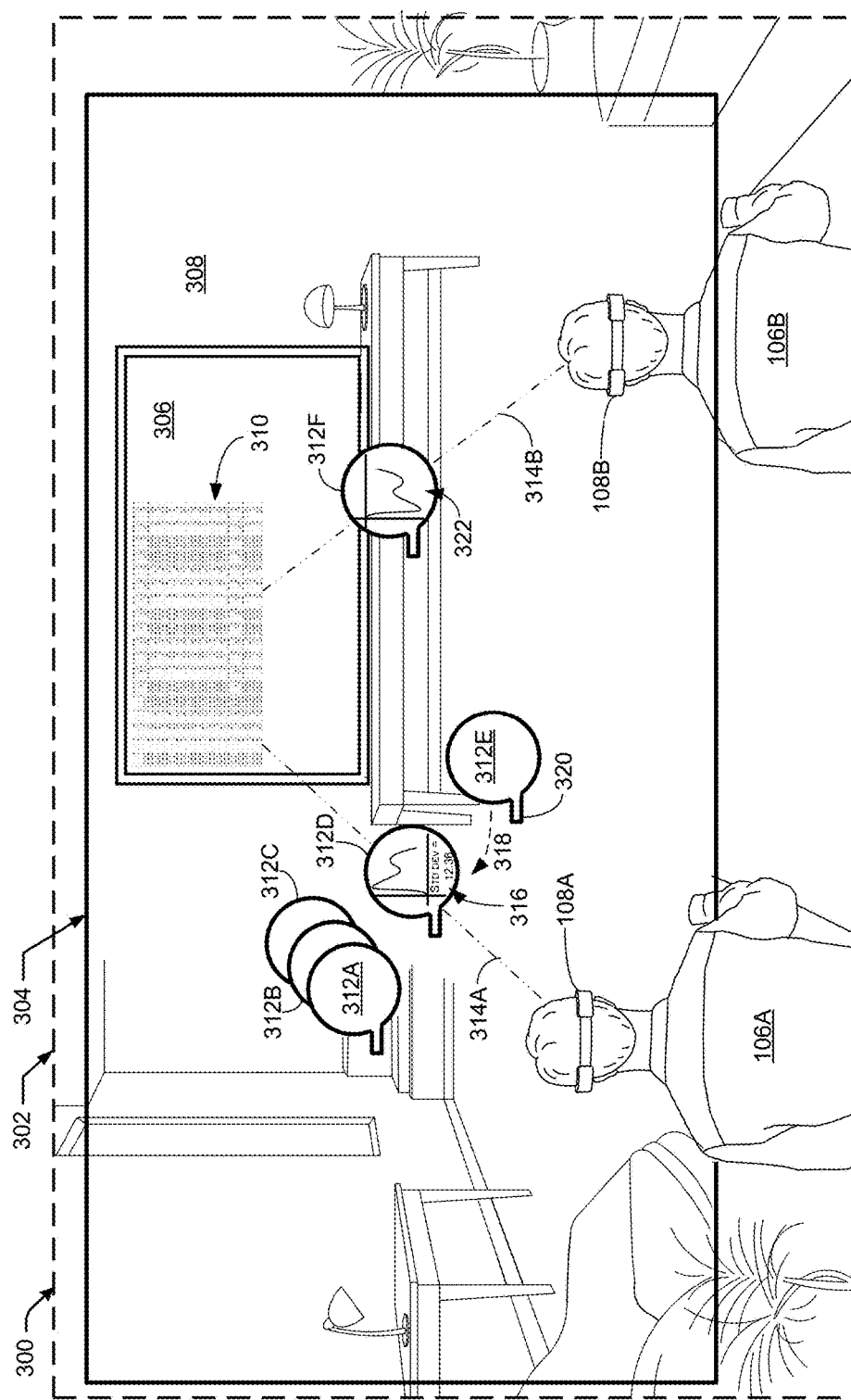
FIG. 3 is a schematic diagram showing an example of a view of a mixed reality environment wherein two or more users can interact with one another and/or with virtual content that is presented in the mixed reality environment.

FIG. 3 is a schematic diagram showing an example of a first view 300 (e.g., a front view) of a mixed reality environment wherein two or more users (e.g., user 106A and user 106B) can interact with one another and/or with virtual content that is presented in the mixed reality environment. The area depicted in the dashed lines corresponds to a real scene 302 in which the first user (e.g., user 106A) and a second user (e.g., user 106B) are physically present. In some examples, the first user (e.g., user 106A) or the second user (e.g., user 106B) may be remotely located and can be virtually present in the mixed reality environment (e.g., as an avatar, a reconstructed 3D model that has been captured using various sensors and/or cameras (e.g., KINECT® or TOF camera)). That is, the device (e.g., device 108A) corresponding to one of the users (e.g., user 106A) may receive streaming data to render the remotely located user (e.g., user 106B) in the mixed reality environment presented by the device (e.g., device 108A). The area depicted in the solid black line corresponds to the spatial region 304 in which the mixed reality environment is visible to the first user (e.g., user 106A) via a display 204 of a corresponding device (e.g., device 108A). As described above, in some examples, the spatial region can occupy an area that is substantially coextensive with a user's (e.g., user 106A) actual field of vision and in other examples, the spatial region can occupy a lesser portion of a user's (e.g., user 106A) actual field of vision. Additional users (e.g., user 106C, etc.) may be present but not visible in the spatial region 304.

In the example of FIG. 3, the first user (e.g., user 106A) can be viewing various virtual content items in the user's mixed reality environment via a display 204 of his device (e.g., device 108A). As described below, the first user (e.g., user 106A) can have authenticated his device (e.g., device 108A). Based at least in part on authenticating his device (e.g., device 108A), the rendering module 136 associated with his device (e.g., device 108A) can render the various virtual content items on the display 204 corresponding to his device (e.g., device 108A). As a non-limiting example, the first user (e.g., user 106A) can view a graphical representation of a display board 306, which may be a real object, or may be a virtual object superimposed onto a real surface, such as a wall 308. In most cases, graphical representations in FIG. 3 are shown in thick black lines to show that they represent virtual content. Source material 310, described below, may be virtually displayed on display board 306 or surface 308. In some other examples, source material 310 may be a real object (e.g., projected or drawn) on surface 308. For example, optical recognition techniques may be used to convert real math objects (e.g., numbers, operators, functions, symbols, etc.) into source material 310 that may be operated on by computer executable code. Such real math objects may be drawn on a real surface (e.g., white/black board, paper, wall, etc.) or may be in images of photos or video frames. In the latter examples, if such photos or video frames are in a digital format then this type of source data may be streamed to a device of one or more users. Source material 310 may comprise tabulated data (e.g., of a database), graphical elements, or other things, for example. In some implementations, portions of content (e.g., math objects) on a real surface may be retrieved or used as source material 310. In other words, whole content need not be used as source material 310 but only a portion thereof may be used.

Virtual objects elements 312A-F (generally referred to as "312") that individually represent mathematical expressions, may be visible to user 106A and/or user 106B (or additional users not illustrated). Elements may be floating in various locations in spatial region 304. Such elements may have any of a number of shapes or sizes. Hereinafter, unless otherwise specified, such elements are considered to be lenses (e.g., virtual lenses), though claimed subject matter is not so limited. Indeed, other examples of elements will be discussed below.

Each of lenses 312 represents one or more functions and/or operators, among other things. For example, each lens may represent a data averaging function, an inverse operator, a smoothing function, a scaler, a graphical rendering function (e.g., bar graph, line graph, scatter graph, etc.), a Fourier transform, Laplace transform, or summation function, just to name a few examples. In some cases, an operator may be a symbol or function denoting an operation. In some examples, source data, as described above, may include functions or operators that may be converted into one or more lenses 312. For instance, a Bessel function mitten on a whiteboard may, via optical recognition techniques, be converted into a digital format (source material) that is subsequently converted into one or more lenses 312.

Each of lenses 312 may be positioned so that as user 106A (or user 106B) looks along a sight line 314A (or 314B) through one or more of the lenses toward displayed source material 310, the user may observe the source material modified by the lens(es) as the function or operator of the lens(es) is applied to the source material 310. In other words, each of the lenses may represent a respective function or operator. Accordingly, these functions or operators are applied to the source material if the sight line intersects these virtual lenses.

As a user moves around in spatial region 304, the user's sight line to source material 310 changes so that various lenses 312 move in or out of the sight line. As this occurs, different functions or operators are alternately applied to the source material, based on which virtual lenses are intersected by the sight line at a particular time (or position of the user(s)). Multiple users, who may be located close to one another or in different geographical locations, may simultaneously interact with lenses 312 in spatial region 304. Thus, individual users may have respective lines of sight (sight lines) so that each user may see results of different (or the same) functions or operators applied to source material 310. In this fashion, collaborating users may explore a space of different alternatives in a meta-structure of mathematical expressions, for example.

Sight lines may generally be from the user (in spatial region 304) to any portion of source material 310. For example, if user 106A is located so that sight line 314A between the user and any portion of source material 310 intersects lens 312D, then the function or operator represented by lens 312D may be applied to the source material 310. The result of such application may be displayed in the area of 312D, as in the example 316, or may be displayed or rendered elsewhere in spatial region 304 (or elsewhere, such as in another display, for example).

In addition to a user moving around in spatial region 304 to change his/her sight line to source material 310, the user may move each of lenses 312, which may generally be floating in spatial region 304. In some examples, lenses 312 may be positioned so that more than one lens is intersected by a sight line. For instance, user 106A may drag and drop (or any other type of virtual relocation may be performed) lens 312E to be located along sight line 314A and between the user and lens 312D. Such movement is indicated by arrow 318. In this example, as described below, a compound function or operator, comprising both functions or operators of lenses 312D and 312E, may be applied to source material 310. Results may be displayed or rendered in the area of lens 312E (since the user's view to lens 312D may be obscured by lens 312E) or any other location in or beyond spatial region 304, for example. Individual lenses 312 may be identified from one another by tags 320, which may include labels or other information, as described below.

In some examples, a user may collaborate with one or more other users. For instance, user 106A may be located so that sight line 314A between the user and source material 310 intersects lens 312D. Thus, the function or operator represented by lens 312D may be applied to the source material. The result of such application may be displayed or rendered in spatial region 304 (or elsewhere, such as in another display, for example) so that user 106B may view the result. Similarly, user 106B may be located so that sight line 314B between the user and source material 310 intersects lens 312F. Thus, the function or operator represented by lens 312F may be applied to the source material. The result of such application may be displayed or rendered in the area of 312F, as in the example depicted by 322. In some examples, the result may be displayed or rendered in spatial region 304 (or elsewhere, such as in another display, for example) so that user 106A may view the result.

In some examples, the first user (e.g., user 106A) can be the owner of each virtual content item. That is, the first user (e.g., user 106A) can determine whether to share individual virtual content items with other users (e.g., user 106B and/or user 106C) in the mixed reality environment, which of the other users (e.g., user 106B and/or user 106C) he/she wants to share individual virtual content items with, or whether to keep individual virtual content items private not share with other users). In the examples above, the first user (e.g., user 106A) may share source material and the results of applying a function or operator of lens 312D to the source material with the second user (e.g., user 106B). In some examples, the second user (e.g., user 106B) may view the source material and the results and may also interact with lens 312D until the first user (e.g., user 106A) decides to make the results private. Based at least in part on the first user (e.g., user 106A) making the results private, the second user (e.g., user 106B) cannot view the results in the mixed reality environment.

Some lenses may (represent functions or operators that) have more than one input and/or output. There may be, for example, two inputs and two outputs associated (and perhaps required) with a lens. In that example, a simple lens may not be able to convey the functionality. Thus, in various examples, some lenses may have an appearance of compound lenses. Each of the sub-lenses may be moveable in order to make it easier to connect with other objects in the room. In a particular example, a virtual object element may represent a tensor virtual prop that is not depicted as a lens in a spatial region because a single input and output are not adequate. Instead this object may be depicted as a box with antennae coming out, each ending in a diamond. In other examples, a lens may have a wide angle so as to have an ability to capture a relatively large amount of input and/or to have an increased likelihood of falling into a line of sight of one or more users. Accordingly, "lenses," as used herein, need not be depicted as lenses or magnifying glasses, and instead may have any of a number of shapes or structures. And, as in the example above, the shape of lenses may be different for lenses representing different functionalities.

FIG. 3 illustrates users looking through sequences of lenses, which are set up in rows to make it easy to see how they can be compounded into a sequence of functions. However, claimed subject matter is not so limited. For example, one may create branching and merging structures of lenses. The lenses may be large enough that there's enough room for a user to look through the lenses slightly on edge, so the user has a diagonal line of sight. In this way, the user can look through one lens that's close to the user such that the user sees any of a number of different next-in-line lenses, depending on the position and angle of the user's head. For example, the user can arrange lenses to support a variety of sequences of functions at the same time, going beyond just the closest two lenses, depending on the line of sight selected by head position and gaze direction. In this fashion, multiple users can walk around to explore a meta-structure of related mathematical expressions.

In some examples, a user can look through a lens from the back, or flip the lens around to get the inverse function, provided the inverse is defined and supported by the back-end math package in use, for example.

In some examples, lenses (or other virtual objects) need not perform a function or operator but instead help a user make the most of a spatial region. Such lenses may be analogous to mirrors, splitters, combiners, transporters, and so on. A combination of one or more such lenses and mirrors, splitters, combiners, transporters, and so on may be considered to be a virtual "optical system." Virtual lenses or an optical system (e.g., which need not perform a math function) may change the location in the room (e.g., spatial region 304) where a phase of the computation or expression can be viewed, but not the results or content, for example.

In some examples, lenses (or other virtual objects) may contain a whole room, effectively encapsulating multiple functions. For example, there may be use scenarios in which users are sometimes exploring a higher level of "the meta-structure of related mathematical expressions," and sometimes exploring logically lower-level portions that have been encapsulated from the higher-level perspective. In some examples, a mixed or virtual environment, such as that illustrated in FIG. 3, may be a 3-D slice of a 4-D (or higher) domain. For instance, such a higher dimension may be useful (or necessary) to describe mathematical operations involving multiple variables and/or projections of such variables in axes of a higher-dimensional space.

Figure 4:
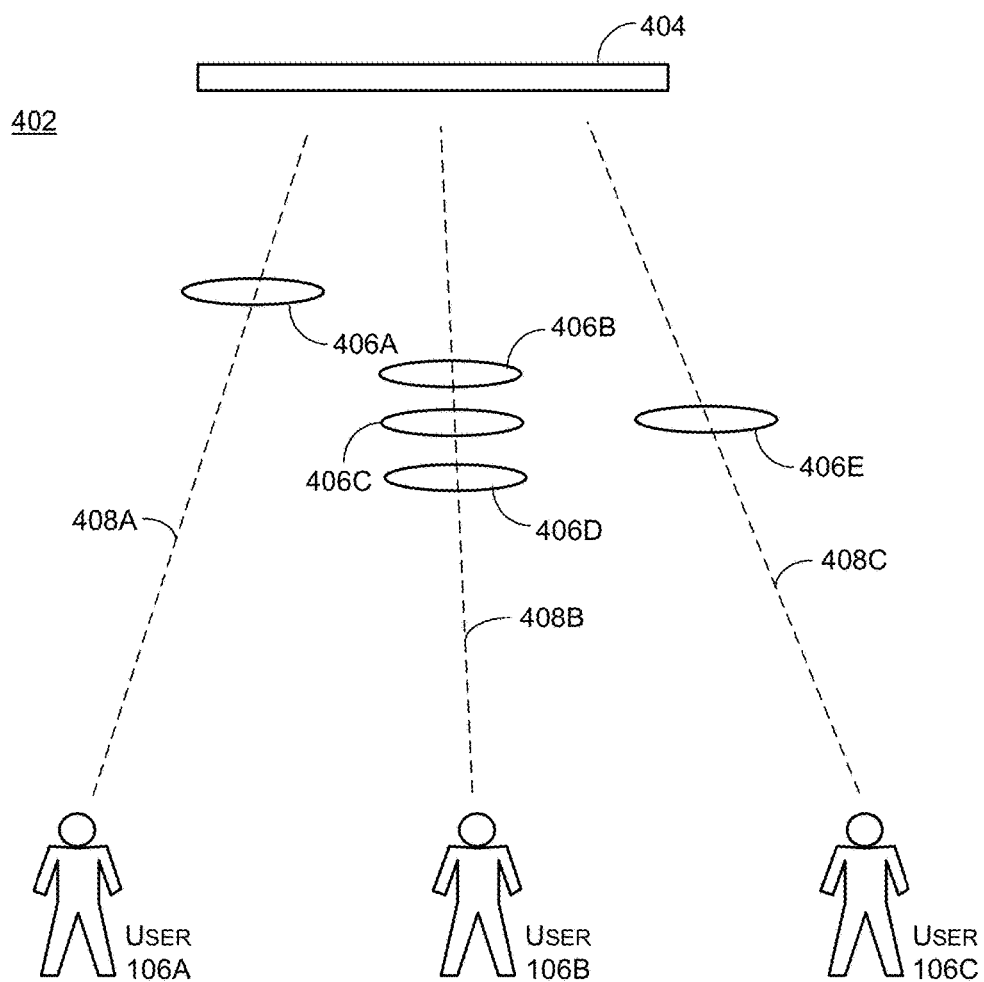
FIG. 4 is a schematic view depicting a spatial region in which a mixed reality environment is visible to a user via a display of a corresponding device, according to some examples.

FIG. 4 is a schematic view depicting a spatial region 402 in which a mixed reality environment is visible to user 106A, user 106B, and 106C via a display 204 of a corresponding device (e.g., devices 108A, 108B, and 108C, respectively). Spatial region 402 includes source material 404 and lenses 406, which includes 406A-E.

In some examples, source material 404 may be tabulated data, such as that of a spreadsheet or data listing. In some examples, source material 404 may be real-time data from a measuring device. For example, such data may stream from a data source and populate source material in real time. In still other examples, source material 404 may be graphical elements, such as images or image components (e.g., points, lines, arcs, splines, colors, polygons, and so on). Source material 404 may be displayed in spatial region 402 on a real or virtual surface or may be floating in space. In this example, the source material may be presented in a plane or curved shape (e.g., a list of numbers floating in space of spatial region 402).

Users 106A, 106B, and 106C (among other additional users not illustrated) may move around in spatial region 402 so that their respective sight lines, 408A, 408B, and 408C intersect or avoid one or more of lenses 406. For example, user 106A is located in spatial region 402 so that sight line 408A intersects lens 406A. User 106B is located in spatial region 402 so that sight line 408B intersects lenses 406B, 406C, and 406D. User 106C is located in spatial region 402 so that sight line 408C intersects lens 406E. In some examples, lenses 406 may be stationary while users 106 move around in spatial region 402. In this case, the user's sight lines generally change, and thus different lenses may be intersected (or not) by the respective moving sight lines. In other examples, one or more of users 106 may move any of lenses 406 in spatial region 402. In this case, the user's sight lines don't change but different lenses may be intersected (or not) as the lenses are moved. For instance, user 106C may move lens 406B to be intersected by sight line 408C. As a consequence, user 106C may observe source material 404 modified by a composite of functions (or operators) represented by lenses 406B and 406E. There need not be a change for user 106B location of lens 406B may be unchanged with respect to user 106B. For example, only user 106C observes (and may have caused) the movement of lens 406B.

In some examples, lenses may be collapsed or grouped into a single lens. For example, a user may group lenses 406B, 406C, and 406D together into a single lens (not illustrated) having the same functionality as a composite of lenses 406B, 406C, and 406D.

Figure 5:
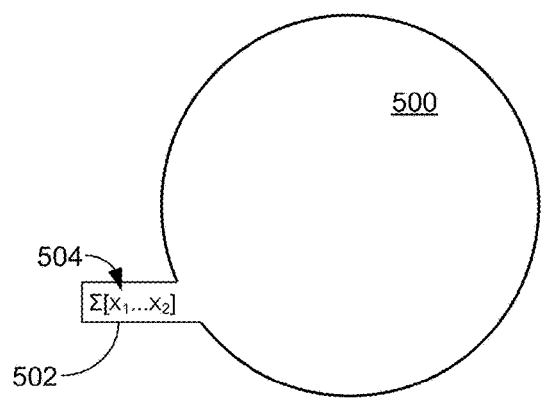
FIG. 5 illustrates an example lens.

FIG. 5 illustrates an example lens 500, which may be the same as or similar to any of lenses 312 of FIG. 3. Lens 500 may include a tag 502 or label 504 that may be used to identify one lens from other lenses. Label 504 may be located in a general area of tag 502 or may be located in another portion of lens 500. In some examples, tag 502 may be used as a handle for moving lens 500 in a spatial region, such as 402.

Label 504 may be a simple identifier, such as a number or a letter, or may be a more descriptive marker, such as an expression or equation that is represented by lens 500. For example, if lens 500 represents a Fourier transform, then label 504 may be "FT," in addition to listing one or more parameters (which may be user configurable) associated with the Fourier transform. In some examples, the size of tag 502 may change in response to relative movements of other lenses in a spatial region. For example, if a first lens occludes a second lens (with respect to a user), then the label of the first lens may increase in size to accommodate the label of both the first lens and the second lens.

Though lens 500 is illustrated as a circle, lens 500 (e.g., lenses 312) may have any of a number of shapes. For example, lens 500 may have a 3D crystal shape that includes a number of facets. Each facet may represent a "subfunction" or parameter of the function of lens 500.

Figure 6:
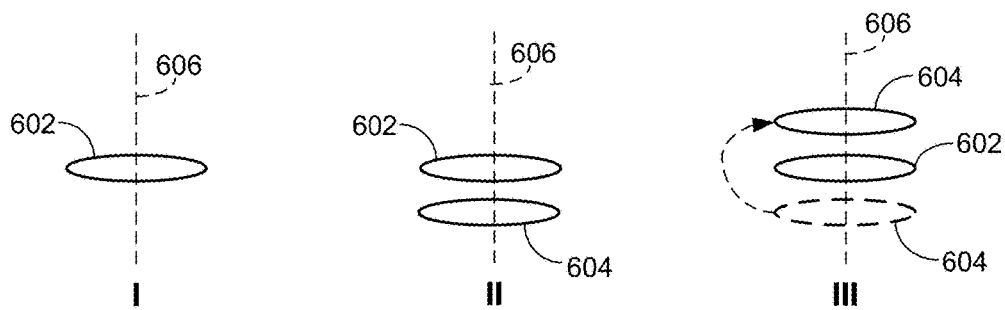
FIG. 6 is a schematic sequence of arrangements of example lenses along a sight line.

FIG. 6 is a schematic sequence (I, II, and III) of arrangements of example lenses 602 and 604 along a sight line 606. In this sequence example, lens 602 represents an operator A and lens 604 represents an operator B. In I, lens 602 is intersected by sight line 606, based on relative positions of a user and source material. Thus, as observed by the user, the source material is operated on by operator A. In II, lens 604 is added to lens 602 along sight line 606. Thus, as observed by the user, the source material is operated on by operator A and operator B. The sequence of operations may be performed based on the ordering of the lenses (e.g., perform operator A first, then perform operator B on the result, or vice versa). In III, lenses 602 and 604 are rearranged so that lens 604 is moved between lens 602 and the source material along sight line 606. Again, as observed by the user, the source material is operated on by operator A and operator B. The sequence of operations may be reversed from II and this may make a difference if operators A and B are non-communitive.

In an alternate example, lens 602 may represent an expression A and lens 604 may represent an expression B. In II, the combination of lenses 602 and 604 along sight line 606 may represent a combination of expressions A and B. For example, expression A may be the first four terms of a Taylor Series and expression B may be the subsequent two terms of the same Taylor Series. Thus, the combination of lenses 602 and 604 may represent the first six terms of the Taylor Series. Note that rearrangement as in III may not make sense though a result may still be produced.

Figure 7:
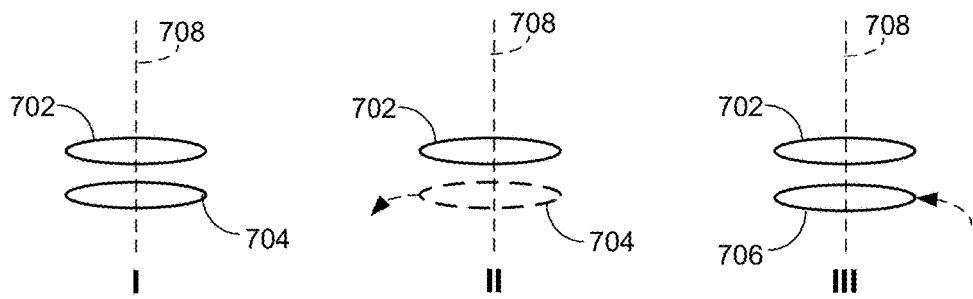
FIG. 7 is a schematic sequence of arrangements of example lenses along a sight line.

FIG. 7 is a schematic sequence (I, II, and III) of arrangements of example lenses 702, 704, and 706 along a sight line 708. In this sequence example, lens 702 represents a function A, lens 704 represents a function B, and lens 706 represents a function C. In I, lenses 702 and 704 are intersected by sight line 708, based on relative positions of a user and source material. Thus, as observed by the user, the source material is operated on by a combination of functions A and B. The sequence of functions may be performed based on the ordering of the lenses (e.g., perform function A first, then perform function B on the result, or vice versa). In II, lens 704 is removed from sight line 708. Thus, as observed by the user, the source material is operated on by only function A. In III, lens 706 is added to lens 702 along sight line 708. Thus, as observed by the user, the source material is operated on by a combination of functions A and C. As before, the sequence of functions may be performed based on the ordering of the lenses (e.g., perform function A first, then perform function C on the result, or vice versa).

Device/Server: Example Architecture and Processes

Figure 8:
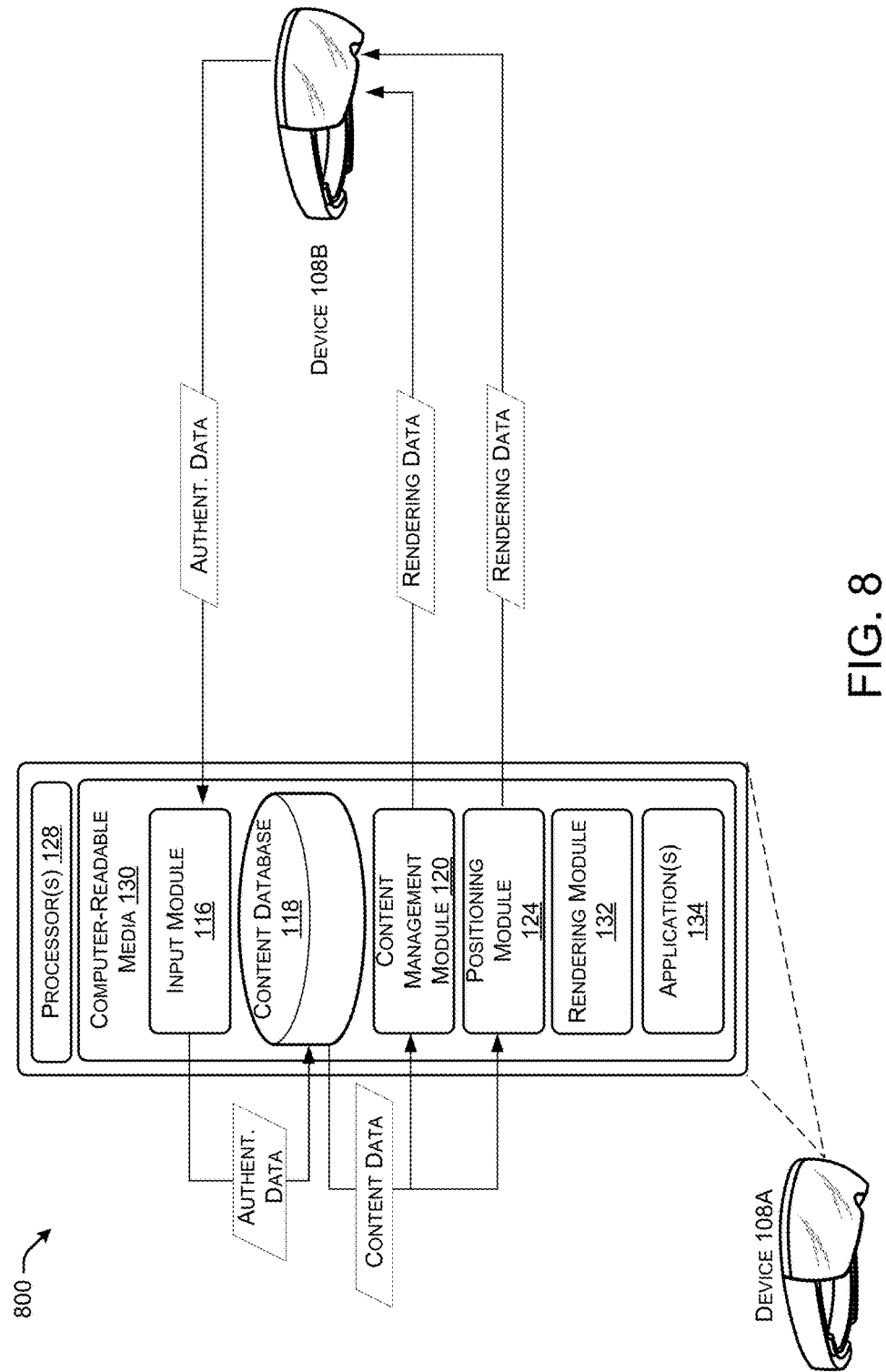
FIG. 8 is a schematic diagram showing an example environment for enabling two or more users in a mixed reality environment to interact with one another and/or with virtual content that is presented in the mixed reality environment.

FIG. 8 is a schematic diagram showing an example environment 800 for enabling two or more users (e.g., user 106A, user 106B, and/or user 106C) in a mixed reality environment to interact with one another and/or with virtual content that is presented in the mixed reality environment. In the example illustrated in FIG. 8, a first device (e.g., device 108A) is assigned a server role and is responsible for synchronizing communications and/or virtual content rendering among all of the devices (e.g., device 108A, device 108B, and/or device 108C). In at least one example, devices (e.g., device 108B and/or device 108C) can run an application 138 locally and connect to the serving device (e.g., device 108A.). In FIG. 8, the input module 116, content database 118, content management module 120, and positioning module 124 can be associated with computer-readable media 134 instead of, or in addition to, computer-readable media 114 associated with the service provider 102.

FIG. 8 illustrates a second device (e.g., device 108B) sending authentication data to the first device (e.g., device 108A). The authentication data can correspond to a user identification and password associated with the second user (e.g., user 106B), biometric identification associated with the second user (e.g., user 106B), etc. The authentication data can be utilized to determine a presence of the second device (e.g., device 108B), visual content items that are available to the second user (e.g., user 106B), and the second user's (e.g., user 106B) permissions corresponding to whether the second user (e.g., user 106B) can view and/or interact with individual ones of the virtual content items, as described above.

Based at least in part on receiving the authentication data, the content management module 120 and/or the frame rendering module 122 can access content data from the content database 118. As described above, data associated with the individual virtual content items can be stored in the content database 118. The content data may identify an owner of a virtual content item, an identification of the virtual content item, and permissions associated with the virtual content item. The content data can identify virtual content items that are owned by a profile corresponding to the second user (e.g., user 106B), virtual content items that the second user (e.g., user 106B) has open, and/or content that other users (e.g., user 106A and/or user 106C) have shared with the second user (e.g., user 106B). The content management module 120 and/or the positioning module 124 can utilize the content data to determine whether individual virtual content items can be rendered on various devices (e.g., device 108A and/or device 108C) and/or the permissions associated with each of the individual virtual content items. The content management module 120 and/or the positioning module 124 can send rendering data to the second device (e.g., device 108B) and the second device (e.g., device 108B) can render the corresponding virtual content items in the mixed reality environment associated with the second user (e.g., user 106B). As described above, the second user (e.g., user 106B) can modify the permissions (e.g., visibility, interactivity, etc.) of any of the virtual content items that he or she owns. That is, the second user (e.g., user 106B) can share the virtual content items with other users (e.g., user 106A and/or user 106C). However, the second user (e.g., user 106B) cannot modify the permissions of any of the virtual content items that he or she does not own. The second user (e.g., user 106B) can interact with individual virtual content items until the owner of each of the virtual content items makes a virtual content item private such that the second user (e.g., user 106B) cannot view the virtual content item.

The processes described in FIGS. 9 and 10 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The example processes are described in the context of the environment 800 of FIG. 8 but are not limited to that environment.

Figure 9:
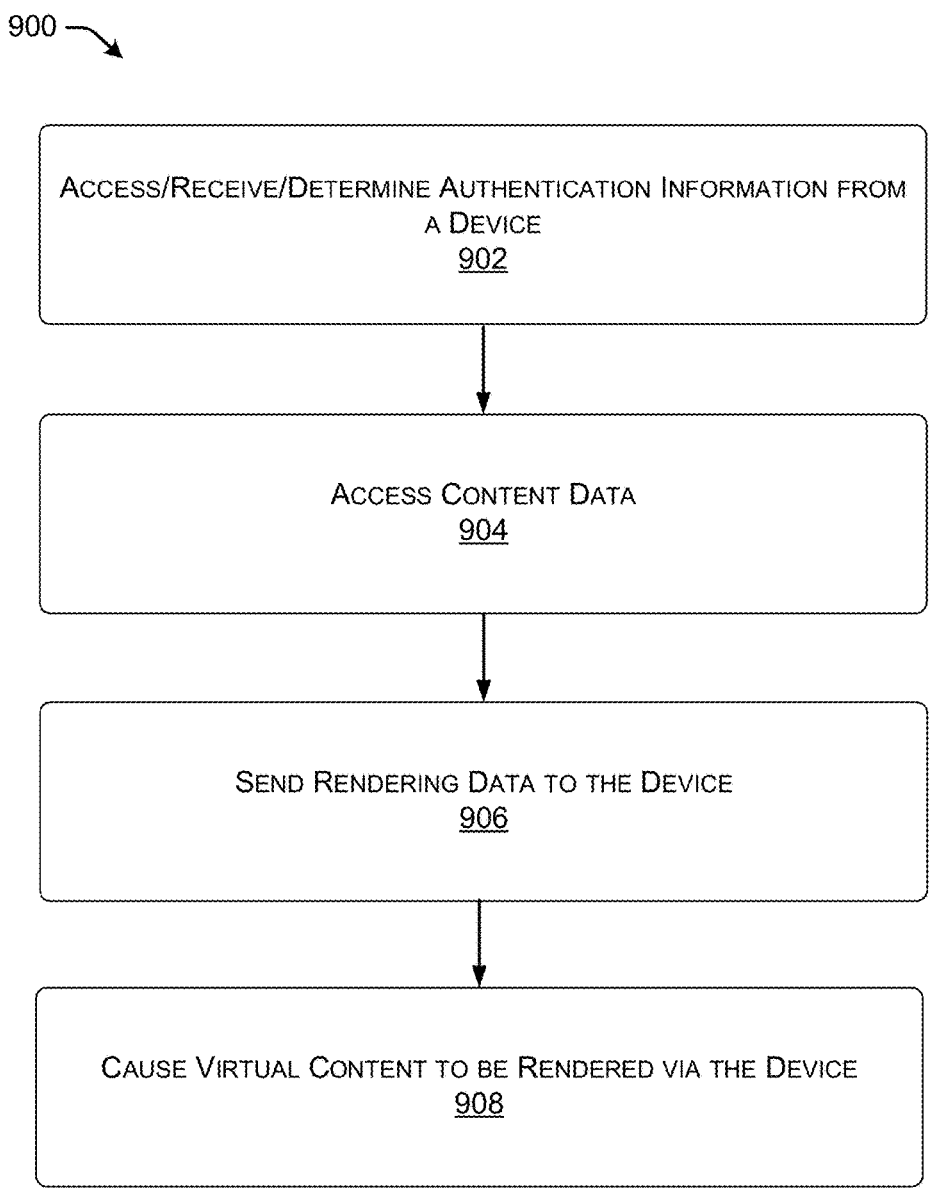
FIG. 9 is a flow diagram that illustrates an example process to cause virtual content to be presented in the mixed reality environment.

FIG. 9 is a flow diagram that illustrates an example process 900 to cause virtual content to be presented in the mixed reality environment.

Block 902 illustrates accessing, receiving, and/or determining authentication information from a device (e.g., device 108B). As illustrated in FIG. 8, a second device (e.g., device 108B) can send authentication data to a first device (e.g., device 108A) that can be designated as a server. The authentication data can correspond to a user identification and password associated with the second user (e.g., user 106B), biometric identification associated with the second user (e.g., user 106B), etc. The authentication data can be utilized to determine a presence of the second device (e.g., device 108B), visual content items that are available to the second user (e.g., user 106B), and the second user's (e.g., user 106B) permissions corresponding to whether the second user (e.g., user 106B) can view and/or interact with the virtual content items, as described above.

Block 904 illustrates accessing content data. Based at least in part on receiving the authentication data, content management module 120 and/or positioning module 124 can access content data from the content database 118. As described above, the content database 118 can include content data indicating an owner identification, a content identification, and permissions associated with the individual virtual content items. The content data can identify virtual content items that are owned by a profile corresponding to the second user (e.g., user 106B) and/or content that other users (e.g., user 106A and/or user 106C) have shared with the second user (e.g., user 106B).

Block 906 illustrates sending rendering data to the device (e.g., device 108B). The content management module 120 and/or positioning module 124 can send the rendering data to the second device (e.g., device 108B). As described above, rendering data may include instructions for rendering a graphical representation of a virtual content item via a display of a device (e.g., device 108A). For instance, the rendering data may include instructions describing the geometry, viewpoint, texture, lighting, shading, etc. associated with a virtual content item.

Block 908 illustrates causing virtual content to be rendered via the device (e.g., device 108B). The second device (e.g., device 108B) can leverage the rendering data to render virtual content items in the mixed reality environment associated with the second user (e.g., user 106B) via the rendering module 136 associated with the second device (e.g., device 108B). As described above, the second user (e.g., user 106B) can modify the permissions (e.g., visibility, interactivity, etc.) of any of the virtual content items that he or she owns. That is, the second user (e.g., user 106B) can determine who he or she desires to share the virtual content items with and/or permissions the other users (e.g., user 106A and/or user 106C) have with respect to interacting with the virtual content items. However, the second user (e.g., user 106B) cannot modify the permissions of any of the virtual content items that he or she does not own. The second user (e.g., user 106B) can interact with individual virtual content items until the owner of each of the virtual content items makes a virtual content item private such that the second user (e.g., user 106B) cannot view the virtual content item.

Figure 10:
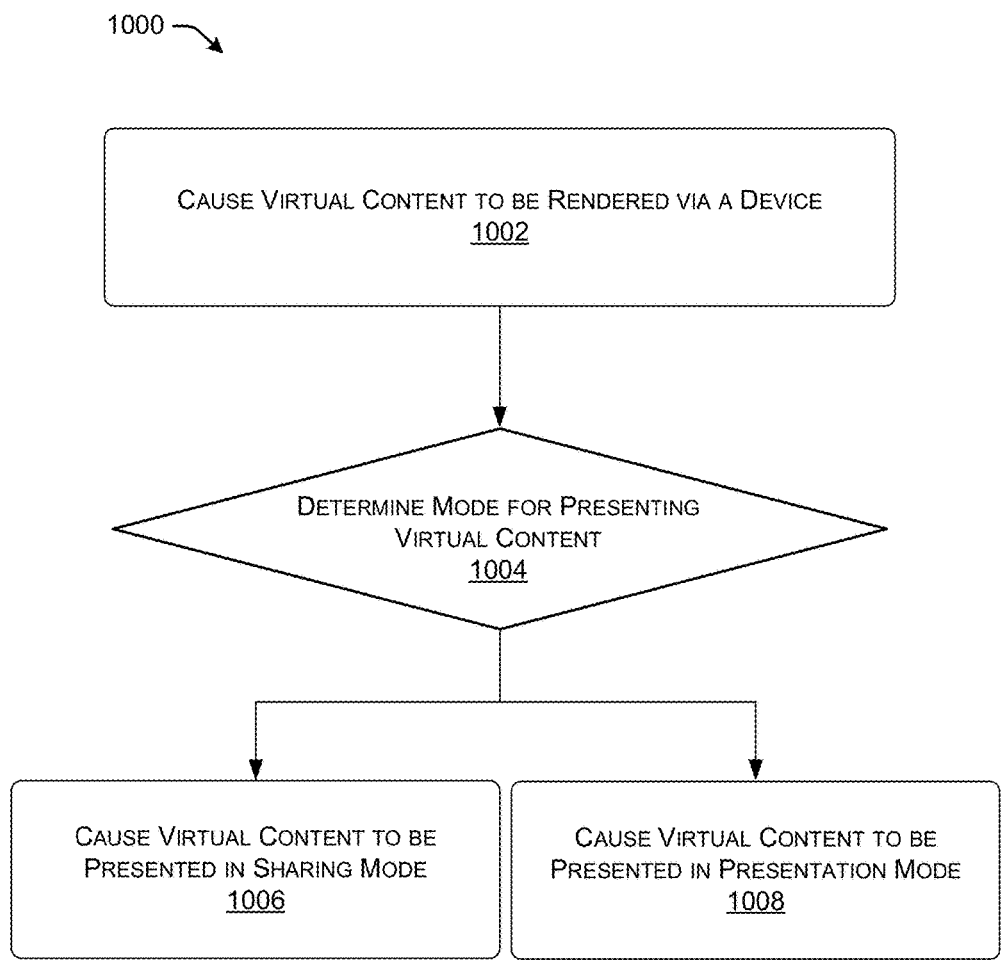
FIG. 10 is a flow diagram that illustrates an example process to cause virtual content to be presented in the mixed reality environment in different modes (e.g., presenter mode or sharing mode).

FIG. 10 is a flow diagram that illustrates an example process 1000 to cause virtual content to be presented in the mixed reality environment in different modes (e.g., presenter mode or sharing mode).

Block 1002 illustrates causing virtual content to be rendered via a device (e.g., device 108A, device 108B, and/or device 108C). As described above, the rendering module 136 associated with the device (e.g., device 108A, device 108B, and/or device 108C) can render virtual content items corresponding to the rendering data in the mixed reality environment associated with the user (e.g., user 106A, user 106B, and/or user 106C).

Block 1004 illustrates determining a mode for presenting the virtual content. In some examples, the content management module 120 can determine whether a user (e.g., user 106A) desires to present the virtual content in a sharing mode, whereby other users (e.g., user 106B and/or user 106C) can view virtual content items that the user (e.g., user 106A) shared with them via an enhanced user interface such that the virtual content items augment the real scene where the other users (e.g., user 106B and/or user 106C) are physically located within the spatial region, or a presentation mode. The presentation mode can enable the user (e.g., user 106A) to share all of the virtual content that the user (e.g., user 106A) has open (i.e., is visible on the user's (e.g., user 106A) display 204) with the other users (e.g., user 106B and/or user 106C). In such an example, the user (e.g., user 106A) can share menus, wands, virtual content items, etc. That is, the presentation mode can enable the user (e.g., user 106A) to share all of the content he or she has open with all of the other users (e.g., user 106B and/or user 106C) (i.e., make all virtual content items public) and share menus that the user (e.g., user 106A) generally can see in his or her first person view.

Block 1006 illustrates causing the virtual content to be presented in sharing mode. As described above, the owner of a virtual content item can determine who he or she wants to share the virtual content item with. In at least one example, the owner of the virtual content item can interact with a virtual menu presented to the user (e.g., user 106B) in the mixed reality environment. As described above, the virtual menu can include graphical representations of sharing settings, such as, but not limited to, private, public, etc. The virtual menu can be a drop down menu, a radial menu, etc. The virtual menu can provide the user (e.g., user 106B) with controls for indicating whether the user (e.g., user 106B) desires to make the virtual content item private or public, as described above. If the user (e.g., user 106B) desires to keep the virtual content item private, no other users (e.g., user 106A and/or user 106C) can see the virtual content item. If the user (e.g., user 106B) desires to make the virtual content item public, all of the other users (e.g., user 106A and/or user 106C) can see the virtual content item. In some examples, the user (e.g., user 106B) can specify one or more users (i.e., less than all users) with whom he or she desires to share the virtual content item. This permissions data can be provided to the content database 118 for storing with the content data. Accordingly, based at least in part on accessing, receiving, and/or determining authentication data, the content management module 120 and/or the positioning module 124 can access content data including permissions data indicating which users 106 have permission to view and/or interact with individual content data items. The other devices (e.g., device 108A and/or device 108C) can render virtual content items based at least in part on receiving rendering data from the content management module 120 and/or the positioning module 124. The other users (e.g., user 106A and/or user 106C) can view the rendered virtual content items in their own first person perspective.

Block 1008 illustrates causing the virtual content to be presented in presentation mode. In other examples, the content management module 120 can determine that a user (e.g., user 106B) desires to share his or her mixed reality environment with other users (e.g., user 106A and/or user 106C) in a presenter mode. Accordingly, the content management module 120 and/or the positioning module 124 can send rendering data to devices associated with the other users (e.g., device 108A and/or device 108C) such that the corresponding rendering modules 136 can render virtual content consistent with the virtual content presented in the user's (e.g., user 106B) mixed reality environment. The presenter mode enables the user (e.g., user 106B) to show other users (e.g., user 106A and/or user 106C) how to use an application or give a demonstration of the system. Presenter mode is similar to various desktop sharing functionalities. The other users (e.g., user 106A and/or user 106C) can see the user's (e.g., user 106B) mixed reality environment from their own first person perspective. In at least one example, the other users (e.g., user 106A and/or user 106C) can see their private mixed reality environment in addition to the mixed reality environment of the user (e.g., user 106B).

Service Provider/Server: Example Architecture and Processes

Figure 11:
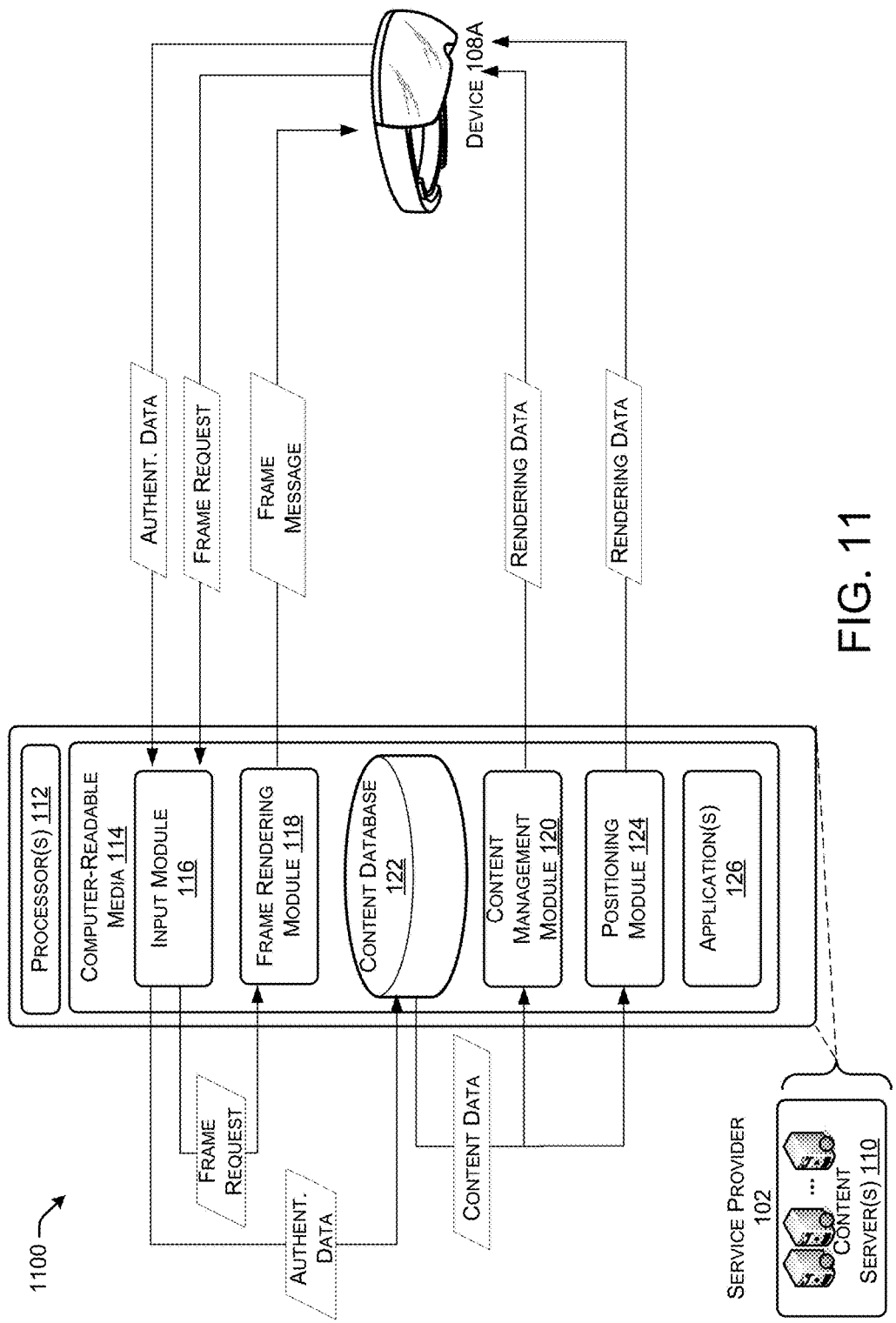
FIG. 11 is a schematic diagram showing an example environment for enabling two or more users in a mixed reality environment to interact with one another and/or with virtual content that is presented in the mixed reality environment.

FIG. 11 is a schematic diagram showing an example environment 1100 for enabling two or more users (e.g., user 106A, user 106B, and/or user 106C) in a mixed reality environment to interact with one another and/or with virtual content that is presented in the mixed reality environment. In FIG. 11, the service provider 102 serves a server role and is responsible for synchronizing communication and/or virtual content rendering by the devices (e.g., device 108A, device 108B, and/or device 108C). The devices (e.g., devices 108A, device 108B, and/or device 108C) can run an application 138 locally and receive frame messages and/or frames for presenting the virtual content.

FIG. 11 illustrates a device (e.g., device 108A) sending authentication data to the service provider 102. The authentication data can correspond to a user identification and password associated with the user (e.g., user 106A), biometric identification associated with the user (e.g., user 106A), etc. The authentication data can be utilized to determine a presence of the device (e.g., device 108A), visual content that is available to the user (e.g., user 106A), and the user's (e.g., user 106A) permissions corresponding to whether the user (e.g., user 106A) can view and/or interact with the virtual content, as described above.

Additionally, the device (e.g., device 108A) can send frame request messages in real time, as described above. The frame rendering module 122 can be configured to generate frame messages responsive to the frame requests, as described above. The frame rendering module 122 can send frame messages directly to devices 108.

Based at least in part on receiving the authentication data, the content management module 120 and/or the positioning module 124 can access content data from the content database 118. As described above, individual virtual content items can be associated with data in the content database 118 indicating an owner identification, a content identification, and permissions associated with the individual virtual content items.

Unlike the example environment 1100, in this example, the service provider 102 cannot simply send content data to the device (e.g., device 108A) and the device (e.g., device 108A) cannot simply render the virtual content in screenspace as the presentation of the virtual content can be affected by noticeable latency (e.g., movement of a user (e.g., user 106A) and/or device (e.g., device 108A) that happened before a frame is rendered on the device (e.g., device 108A)), instead, in at least one example, the rendering module 136, stored locally on the device (e.g., device 108A), can utilize the frame messages for rendering and/or presenting the virtual content via the device (e.g., device 108A), as described above.

The process described in FIG. 12 below is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The example process is described in the context of the environment 1100 of FIG. 11 but is not limited to that environment.

Figure 12:
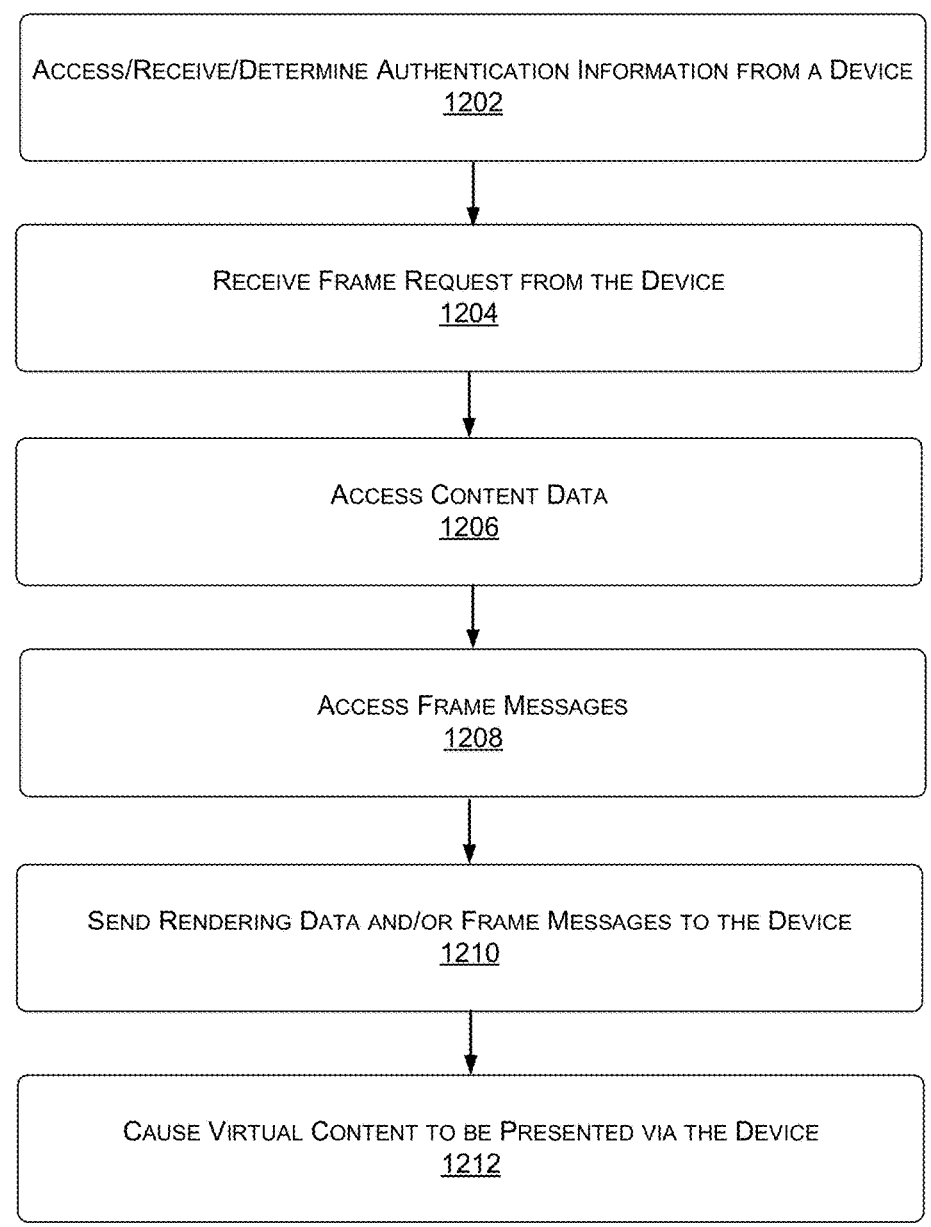
FIG. 12 is a flow diagram that illustrates an example process to cause virtual content to be presented in the mixed reality environment.

FIG. 12 is a flow diagram that illustrates an example process 1200 to cause virtual content to be presented in the mixed reality environment.

Block 1202 illustrates accessing, receiving, and/or determining authentication information from a device (e.g., device 108A). As illustrated in FIG. 8, the input module 116 can access, receive, and/or determine authentication data from a device (e.g., device 108A). The authentication data can correspond to a user identification and password associated with the user (e.g., user 106A), biometric identification associated with the user (e.g., user 106A), etc. The authentication data can be utilized to determine a presence of a device (e.g., device 108A), visual content that is available to the user (e.g., user 106A) corresponding to the device (e.g., device 108A), and the user's (e.g., user 106A) permissions corresponding to whether the user (e.g., user 106A) can view and/or interact with the virtual content, as described above.

Block 1204 illustrates receiving a frame request from the device (e.g., device 108B). The frame rendering module 122 can receive frame request messages from the device (e.g., device 108A), as described above.

Block 1206 illustrates accessing content data. Based at least in part on receiving the authentication data, the content management module 120 and/or the positioning module 124 can access content data from the content database 118. As described above, content data can be stored in the content database 118 indicating an owner identification, a content identification, and permissions associated with the individual virtual content items.

Block 1208 illustrates accessing frame messages. The frame rendering module 122 can be configured to output frame messages and send the frame messages directly to devices 108, as described above.

Block 1210 illustrates sending rendering data and/or frame messages to the device (e.g., device 108A). In some examples, the rendering module 136 can receive previously rendered frames associated with frame messages from the service provider 102 to correct for potential latency and/or render correct perspectives based on the position of the user (e.g., user 106A) in worldspace. In other examples, the rendering module 136 may receive rendering data for rendering the virtual content items locally.

Block 1212 illustrates causing virtual content to be presented via the device (e.g., device 108A). The device (e.g., device 108A) can render virtual content items corresponding to rendering data in the mixed reality environment associated with the user (e.g., user 106A) via the rendering module 136 associated with the device (e.g., device 108A). As described above, in some instances, the service provider 102 may be unable to send rendering data to the device (e.g., device 108A) and the device (e.g., device 108A) may be unable to render the virtual content in screenspace as the presentation of the virtual content can be affected by noticeable latency. Instead, in at least one example, the rendering module 136, stored locally on the device (e.g., device 108A), can leverage the frame messages to cause the virtual content items to be presented via the device (e.g., device 108A), as described above.

Modifying Visibility and Interacting with Virtual Content Items

Figure 13:
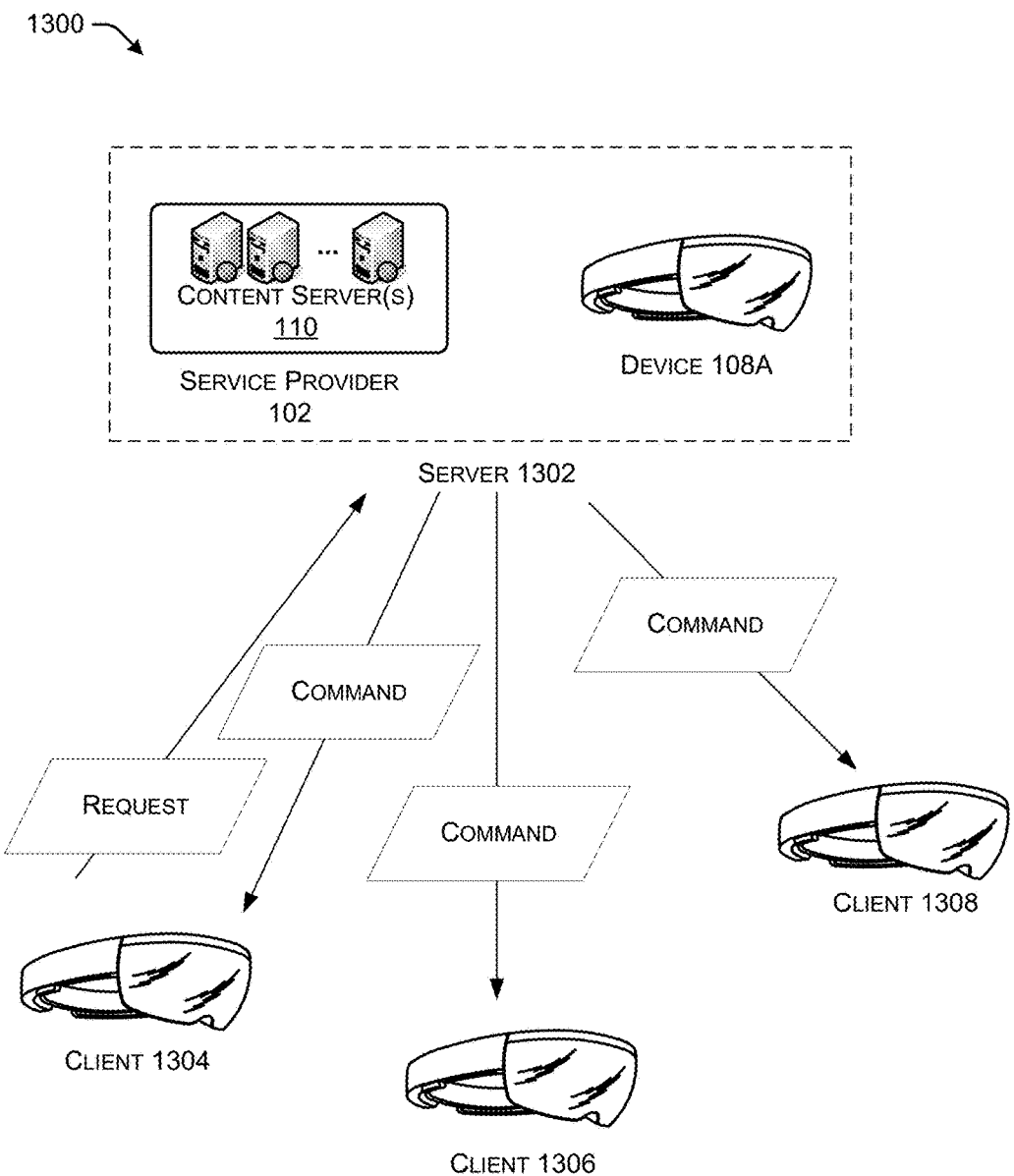
FIG. 13 is a schematic diagram showing an example environment for enabling two or more users in a mixed reality environment to interact with one another and/or with virtual content that is presented in the mixed reality environment.

FIG. 13 is a schematic diagram showing an example environment 1300 for enabling two or more users (e.g., user 106A, user 106B, and/or user 106C) in a mixed reality environment to interact with one another and/or with virtual content that is presented in the mixed reality environment. In the example environment 1300, a server 1302 can send and receive data to one or more client devices (e.g., client 1304, client 1306, and/or client 1308). The server 1302 can be the service provider 102 or a device (e.g., device 108A). Each of the client devices (e.g., client 1304, client 1306, and/or client 1308) can correspond to device 108A, 108B, and/or 108C. The one or more client devices (e.g., client 1304, client 1306, and/or client 1308) can send requests and receive data associated with commands for rendering and/or interacting with virtual content. The server 1302 can manage the requests and commands to synchronize communication and/or virtual content rendering between the one or more client devices (e.g., client 1304, client 1306, and/or client 1308) and to support security, syncing of variables (e.g., state variables), managing timing (e.g., animation timing, etc.), etc.

The processes described in FIGS. 14-17 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The example process is described in the context of the environment 1300 of FIG. 13 but is not limited to that environment.

FIG. 14 is a flow diagram that illustrates an example process 1400 to cause the visibility of virtual content to be modified in the mixed reality environment.

Block 1402 illustrates receiving, from a first client device (e.g., client 1304), a request to share a virtual content item with one or more other client devices (e.g., client 1306 and/or client 1308). In this example, the first client device (e.g., client 1304) can be the owner of the virtual content item and can determine who to share the virtual content item with and/or when to make the virtual content item private.

Block 1404 illustrates sending a command to one or more other client devices (e.g., client 1306 and/or client 1308). The server 1302 can send the command to the one or more other client devices (e.g., client 1306 and/or client 1308). The command can include rendering data and, in some examples, frame messages for rendering by the one or more other client devices (e.g., client 1306 and/or client 1308), as described above.

Block 1406 illustrates causing the virtual content item to be presented via the one or more other client devices (e.g., client 1306 and/or client 1308). As described above, the rendering module 136 associated with the individual client devices (e.g., client 1306 and/or client 1308) can render the virtual content item in the mixed reality environment. The users (e.g., user 106A and/or user 106B) corresponding to the one or more other client devices (e.g., client 1306 and/or client 1308) can interact with the virtual content item as long as the first client device (e.g., client 1302) continues to share the virtual content item with the one or more other client devices (e.g., client 1306 and/or client 1308). In some examples, the one or more client devices (e.g., client 1306 and/or client 1308) may receive previously rendered frames via frame messages and may present the virtual content item based at least in part on presenting the previously rendered frames.

The first client device (e.g., client 1304) can request to make the virtual content item private via a process similar to example process 1400. The first client device (e.g., client 1304) can request to make a virtual content item private with respect to one or more other client devices (e.g., client 1306 and/or client 1308). The server 1302 can send a command to one or more other client devices (e.g., client 1306 and/or client 1308). The command can include data indicating that the virtual content item is no longer visible with respect to one or more of the other client devices (e.g., client 1306 and/or client 1308), as described above. Accordingly, the rendering module 136 associated with the individual client devices (e.g., client 1306 and/or client 1308) can terminate rendering the virtual content item in the mixed reality environment.

In some examples, based at least in part on any one of the client devices (e.g., client 1304, client 1306, and/or client 1308) accessing a virtual content item, the server 1302 can send data associated with a virtual content item to each of the other client devices (e.g., client 1304, client 1306, and/or client 1308). The data can instruct all of the client devices (e.g., client 1304, client 1306, and/or client 1308) (i.e., the rendering module 136 associated with all of the client devices) to create and load the virtual content item. However, the client devices (e.g., client 1304, client 1306, and/or client 1308) can hide the virtual content item until the client devices (e.g., client 1304, client 1306, and/or client 1308) receive data indicating that owner of the virtual content item shared the virtual content item with the client devices (e.g., client 1304, client 1306, and/or client 1308). The owner of the virtual content item can send a request to share the virtual content item with one or more of the other client devices (e.g., client 1304, client 1306, and/or client 1308) and the server 1302 can send a command to the one or more client devices (e.g., client 1304, client 1306, and/or client 1308) so that the one or more client devices (e.g., client 1304, client 1306, and/or client 1308) can render the virtual content item. The command may be associated with rendering data and/or frame messages, as described above.

Figure 15:
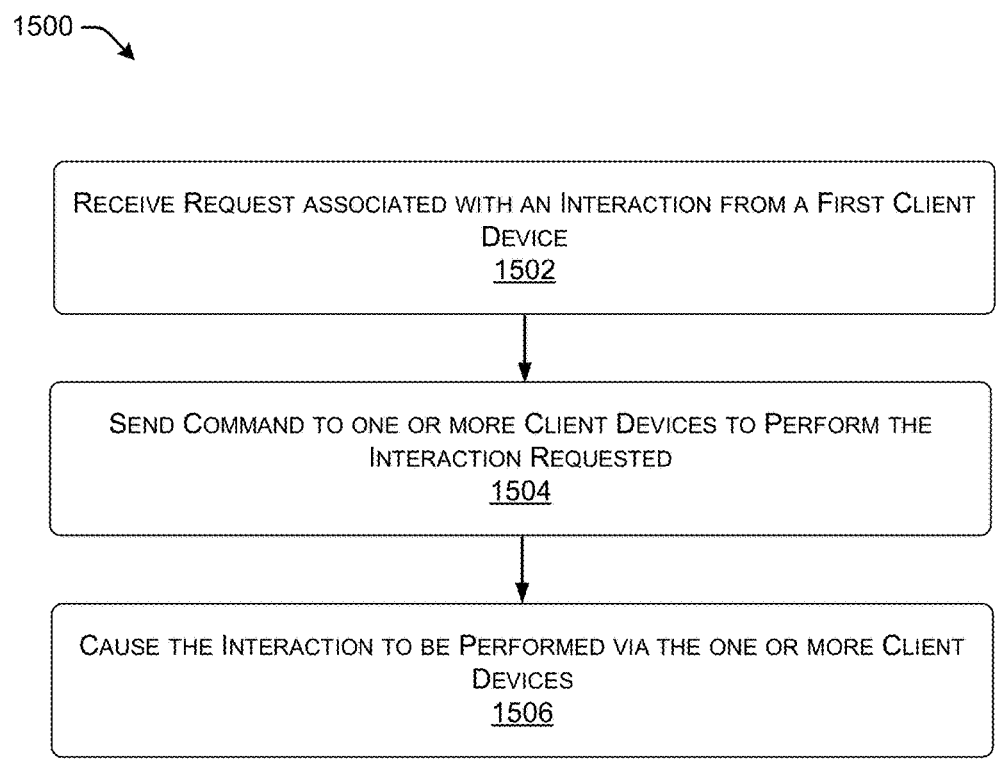
FIG. 15 is a flow diagram that illustrates an example process to cause an interaction associated with the virtual content to be performed via one or more devices in a mixed reality environment.

FIG. 15 is a flow diagram that illustrates an example process 1500 to cause an interaction with a virtual content item to be performed via one or more client devices (e.g., client 1304, client 1306, and/or client 1308) in the mixed reality environment.

Block 1502 illustrates receiving, from a first client device (e.g., client 1304), a request to interact with a virtual content item. For instance, the first client device (e.g., client 1304) can desire to move the virtual content item, cause the virtual item to rotate, etc. Block 1504 illustrates sending a command to all of the client devices (e.g., client 1304, client 1306 and/or client 1308) that have permission to view the virtual content item to perform the interaction requested. The server 1302 can send the command to the client devices (e.g., client 1304, client 1306, and/or client 1308) that have permission to view the virtual content item. The command can include rendering data, data associated with the interaction, and, in some examples, frame messages for rendering by the client devices (e.g., client 1304, client 1306, and/or client 1308), as described above. Block 1506 illustrates causing the interaction to be performed on the virtual content item via the client devices (e.g., client 1304, client 1306, and/or client 1308). As described above, the rendering module 136 associated with the individual client devices (e.g., client 1304, client 1306, and/or client 1308) can render the virtual content item in the mixed reality environment and can modify the virtual content item based on the interaction requested. The users (e.g., user 106A, user 106B, and/or user 106C) corresponding to the client devices (e.g., client 1304, client 1306, and/or client 1308) can interact with the virtual content item as long as the first client device (e.g., client 1304) continues to share the virtual content item with the one or more other client devices (e.g., client 1306 and/or client 1308).

Figure 16:
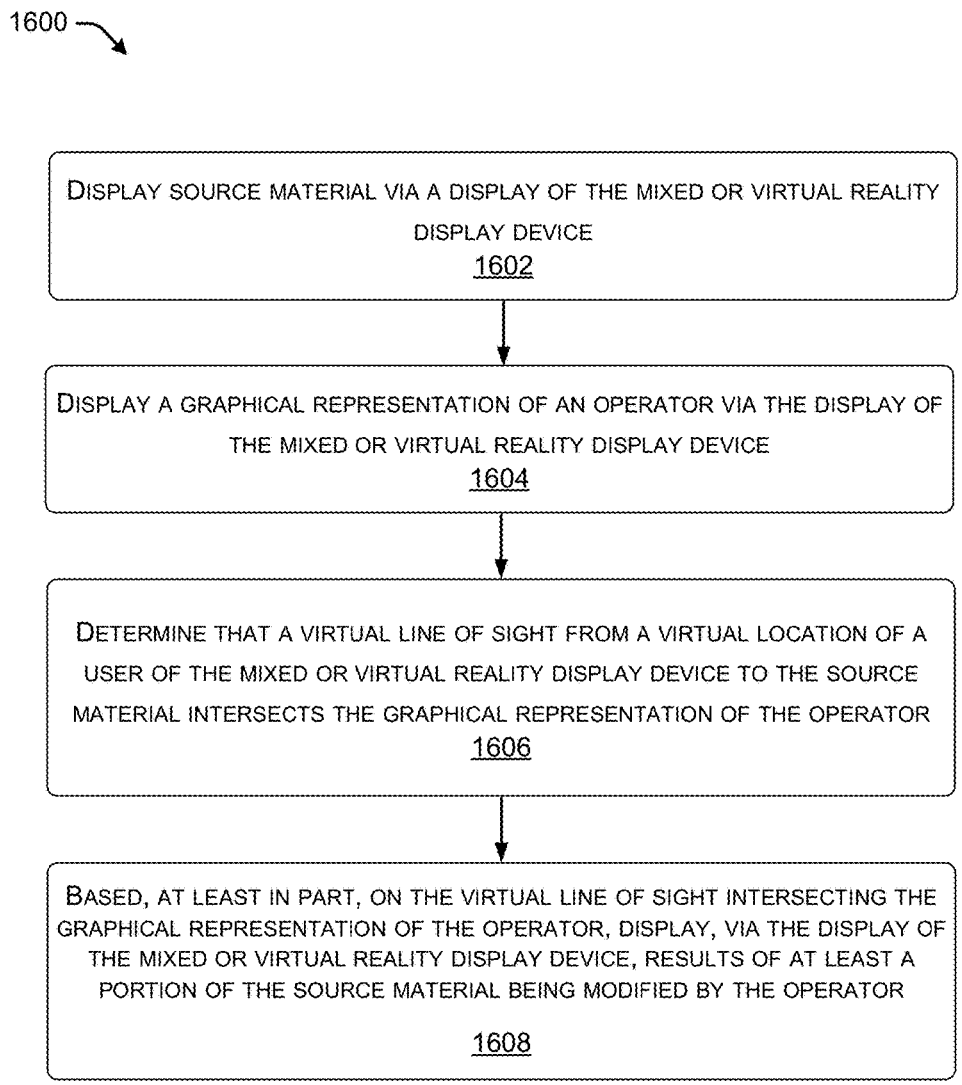
FIG. 16 is a flow diagram that illustrates an example process of performing mathematical operations in a virtual or mixed reality environment.

FIG. 16 is a flow diagram that illustrates an example process of performing mathematical operations in a virtual or mixed reality environment. For example, process 1600 may be performed by processor 112, illustrated in FIG. 1.

In block 1602, a processor may display source material via a display of the mixed or virtual reality display device. Source material 310, for example, may be virtually displayed on a display board or surface. In some other examples, source material may be a real object (e.g., projected or drawn) on a surface. For example, optical recognition techniques may be used to convert real math objects (e.g., numbers, operators, functions, symbols, etc.) into source material that may be operated on by computer executable code.

In block 1604, the processor may display a graphical representation of an operator via the display of the mixed or virtual reality display device. Such a graphical representation may be a virtual lens, for example. In block 1606, the processor may determine that a virtual line of sight from a virtual location of a user of the mixed or virtual reality display device to the source material intersects the graphical representation of the operator. In block 1608, based, at least in part, on the virtual line of sight intersecting the graphical representation of the operator, the processor may display, via the display of the mixed or virtual reality display device, results of at least a portion of the source material being modified by the operator.

Figure 17:
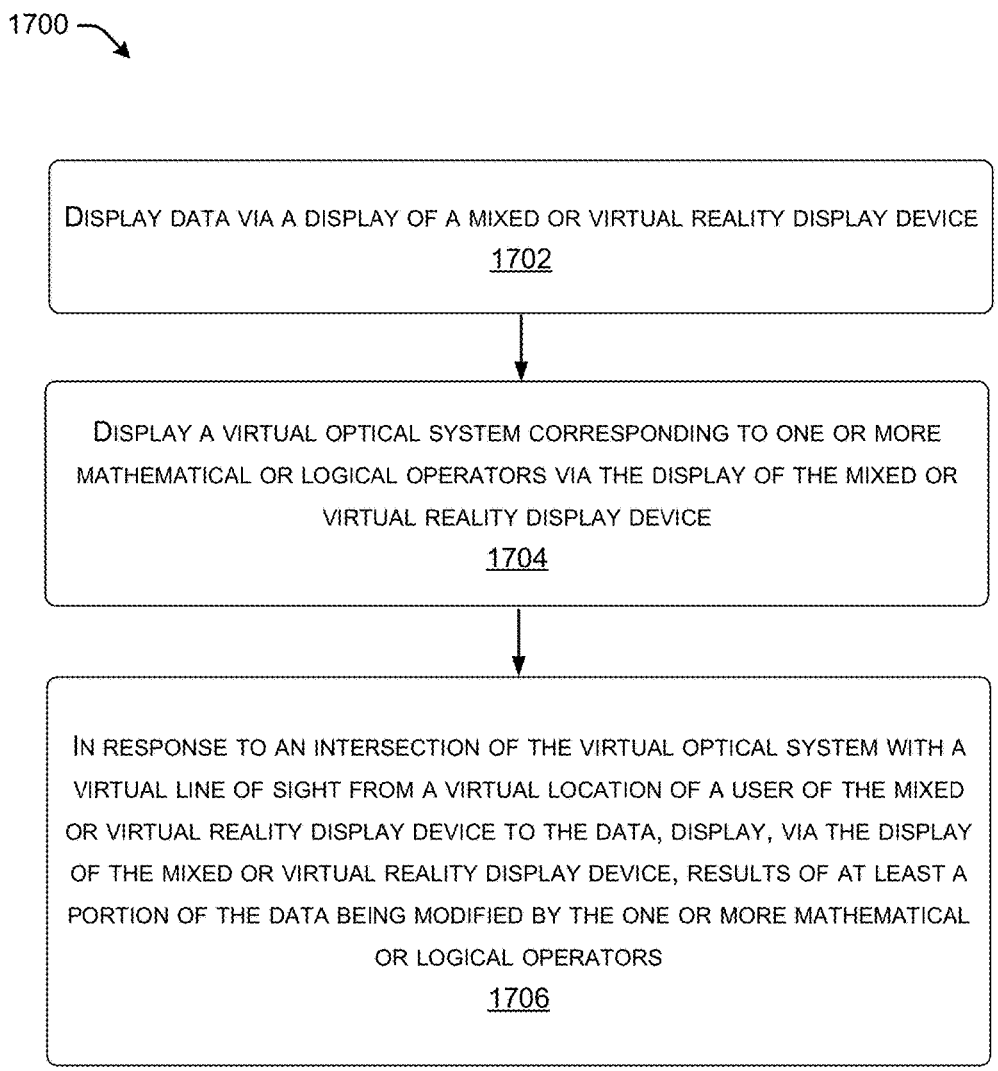
FIG. 17 is a flow diagram that illustrates another example process of performing mathematical operations in a virtual or mixed reality environment.

FIG. 17 is a flow diagram that illustrates another example process of performing mathematical operations in a virtual or mixed reality environment. For example, process 1700 may be performed by processor 112, illustrated in FIG. 1.

In block 1702, a processor may display data via a display of a mixed or virtual reality display device. Source material 310, for example, may be virtually displayed on a display board or surface and used as data. In some other examples, source material may be a real object (e.g., projected or drawn) on a surface. For example, optical recognition techniques may be used to convert real math objects (e.g., numbers, operators, functions, symbols, etc.) into source material that may be operated on by computer executable code.

In block 1704, the processor may display a virtual optical system corresponding to one or more mathematical or logical operators via the display of the mixed or virtual reality display device. Such a virtual optical system may be one or more virtual lens, mirrors, filters, etc., for example. In block 1706, in response to an intersection of the virtual optical system with a virtual line of sight from a virtual location of a user of the mixed or virtual reality display device to the data, the processor may display, via the display of the mixed or virtual reality display device, results of at least a portion of the data being modified by the one or more mathematical or logical operators.

EXAMPLE CLAUSES

A. A system comprising: a mixed or virtual reality display device; and a device communicatively coupled to the mixed or virtual reality display device, the device comprising: one or more processors; memory; and one or more modules stored in the memory and executable by the one or more processors to perform operations comprising: displaying source material via a display of the mixed or virtual reality display device; displaying a graphical representation of an operator via the display of the mixed or virtual reality display device; determining that a virtual line of sight from a virtual location of a user of the mixed or virtual reality display device to the source material intersects the graphical representation of the operator; and based, at least in part, on the virtual line of sight intersecting the graphical representation of the operator, displaying, via the display of the mixed or virtual reality display device, results of at least a portion of the source material being modified by the operator.

B. The system as claim A recites, wherein the results of the at least a portion of the source material being modified by the operator is displayed in the graphical representation of the operator.

C. The system as claim A recites, wherein the operator is a mathematical operator, function, scaler, or graphical operator.

D. The system as claim A recites, wherein the graphical representation is a virtual lens.

E. The system as claim A recites, the operations further comprising: displaying additional graphical representations of respective operators via the display of the mixed or virtual reality display device; receiving real-time commands to direct at least one of positioning or ordering of the additional graphical representations of respective operators to be located in new locations; determining that the virtual line of sight to the source material intersects the additional graphical representations of respective operators located in the new locations; and based, at least in part, on the virtual line of sight intersecting one or more of the additional graphical representations of respective operators, displaying, via the display of the mixed or virtual reality display device, second results of at least the portion of the source material being modified by one or more of the respective operators.

F. The system as claim E recites, wherein based at least in part on the virtual line of sight intersecting two or more of the additional graphical representations of respective operators, then the operations further comprise: displaying, via the display of the mixed or virtual reality display device, the second results of at least the portion of the source material being modified by a compound operator comprising two or more of the respective operators.

G. The system as claim E recites, wherein the positioning or ordering of the additional graphical representations of respective operators affects the second results of the compound operator.

H. The system as claim A recites, wherein the mixed or virtual reality display device is a first mixed or virtual reality display device, the operations further comprising: determining that a second virtual line of sight from a virtual location of a second user of a second mixed or virtual reality display device to the presented source material intersects the graphical representation of the operator; and based at least in part on the second virtual line of sight intersecting the graphical representation of the operator, displaying, via a second display of the second mixed or virtual reality display device, the results of at least the portion of the source material being modified by the operator.

I. The system as claim H recites, the operations further comprising: determining that the second virtual line of sight from the second mixed or virtual reality display device to the presented source material intersects a second graphical representation of a second operator; and based at least in part on the second virtual line of sight intersecting the second graphical representation of the second operator, displaying, via the display of the first mixed or virtual reality display device, second results of at least the portion of the source material being modified by the second operator.

J. The system as claim A recites, wherein the source material comprises tabulated data.

K. The system as claim A recites, wherein the source material comprises real-time data from a measuring device.

L. A method comprising: displaying source material via a display of a mixed or virtual reality display device; displaying a graphical representation of an operator via the display of the mixed or virtual reality display device; determining that a virtual line of sight from a virtual location of a user of the mixed or virtual reality display device to the source material intersects the graphical representation of the operator; and based at least in part on the virtual line of sight intersecting the graphical representation of the operator, displaying, via the display of the mixed or virtual reality display device, results of at least a portion of the source material being modified by the operator.

M. The method as claim L recites, wherein the results of the at least the portion of the source material being modified by the operator is displayed in the graphical representation of the operator.

N. The method as claim L recites, wherein the operator is a mathematical operator, function, scaler, or graphical operator.

O. The method as claim L recites, further comprising: displaying additional graphical representations of respective operators via the display of the mixed or virtual reality display device; receiving real-time commands to direct at least one of positioning or ordering of the additional graphical representations of respective operators to be located in new locations; determining that the virtual line of sight to the source material intersects the additional graphical representations of respective operators located in the new locations; and based, at least in part, on the virtual line of sight intersecting one or more of the additional graphical representations of respective operators, displaying, via the display of the mixed or virtual reality display device, second results of at least the portion of the source material being modified by one or more of the respective operators.

P. The method as claim O recites, further comprising, based at least in part on the virtual line of sight intersecting two or more of the additional graphical representations of respective operators: displaying, via the display of the mixed or virtual reality display device, the second results of at least the portion of the source material being modified by a compound operator comprising two or more of the respective operators.

Q. The method as claim L recites, wherein the positioning or ordering of the additional graphical representations of respective operators affects the second results of the compound operator.

R. The method as claim L recites, wherein the mixed or virtual reality display device is a first mixed or virtual reality display device, and further comprising: determining that a second virtual line of sight from a virtual location of a second user of a second mixed or virtual reality display device to the presented source material intersects the graphical representation of the operator; and based, at least in part, on the second virtual line of sight intersecting the graphical representation of the operator, displaying, via a second display of the second mixed or virtual reality display device, the results of at least the portion of the source material being modified by the operator.

S. The method as claim S recites, further comprising: determining that the second virtual line of sight from the second mixed or virtual reality display device to the presented source material intersects a second graphical representation of a second operator; and based, at least in part, on the second virtual line of sight intersecting the second graphical representation of the second operator, displaying, via the display of the first mixed or virtual reality display device, second results of at least the portion of the source material being modified by the second operator.

T. A method comprising: displaying data via a display of a mixed or virtual reality display device; displaying a virtual optical system corresponding to one or more mathematical or logical operators via the display of the mixed or virtual reality display device; and in response to an intersection of the virtual optical system with a virtual line of sight from a virtual location of a user of the mixed or virtual reality display device to the data, displaying, via the display of the mixed or virtual reality display device, results of at least a portion of the data being modified by the one or more mathematical or logical operators.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "may" or "might," unless specifically stated otherwise, are understood within the context to present that certain examples include, while other examples do not include, certain features, variables and/or steps. Thus, such conditional language is not generally intended to imply that certain features, variables and/or steps are in any way required for one or more examples or that one or more examples necessarily include logic for deciding, with or without user input or prompting, whether certain features, variables and/or steps are included or are to be performed in any particular example.

Conjunctive language such as the phrase "at least one of X, Y or Z," unless specifically stated otherwise, is to be understood to present that an item, term, etc. may be either X, Y, or Z, or a combination thereof.

Any process descriptions, variables or blocks in the flow diagrams described herein and/or depicted in the attached figures should be understood as potentially representing modules, segments, or portions of code that include one or more executable instructions for implementing specific logical functions or variables in the routine. Alternate implementations are included within the scope of the examples described herein in which variables or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the variables of which are to be understood as being among other acceptable examples. All such modifications and variations are intended to be included herein within the scope of this disclosure and protected by the following claims.

What is claimed:
1. A system comprising:
a mixed or virtual reality display device; and
a computing device communicatively coupled to the mixed or virtual reality display device, the computing device comprising:
one or more processors;
memory; and
one or more modules stored in the memory and executable by the one or more processors to perform operations comprising:
displaying source material via a display of the mixed or virtual reality display device;
displaying a graphical representation of an operator via the display of the mixed or virtual reality display device;
determining that a virtual line of sight from a virtual location of a user of the mixed or virtual reality display device to the source material intersects the graphical representation of the operator;
based, at least in part, on the virtual line of sight intersecting the graphical representation of the operator, displaying, via the display of the mixed or virtual reality display device, first results of at least one portion of the source material being modified by the operator;
displaying additional graphical representations of respective operators via the display of the mixed or virtual reality display device;

receiving real-time commands to direct at least one of positioning or ordering of the additional graphical representations of the respective operators to be located in new locations;

determining that the virtual line of sight to the source material intersects the additional graphical representations of the respective operators located in the new locations; and based, at least in part, on the virtual line of sight intersecting one or more of the additional graphical representations of the respective operators, displaying, via the display of the mixed or virtual reality display device, second results of the at least one portion of the source material being modified by one or more of the respective operators.

2. The system as claim 1 recites, wherein the first results of the at least one portion of the source material being modified by the operator is displayed in the graphical representation of the operator.

3. The system as claim 1 recites, wherein the operator is a mathematical operator, function, scaler, or graphical operator.

4. The system as claim 1 recites, wherein the graphical representation is a virtual lens.

5. The system as claim 1 recites, wherein based at least in part on the virtual line of sight intersecting two or more of the additional graphical representations of the respective operators, then the operations further comprise:

displaying, via the display of the mixed or virtual reality display device, the second results of the at least one portion of the source material being modified by a compound operator comprising two or more of the respective operators.

6. The system as claim 5 recites, wherein the positioning or ordering of the additional graphical representations of the respective operators affects the second results of the compound operator.

7. The system as claim 1 recites, wherein the mixed or virtual reality display device is a first mixed or virtual reality display device, the operations further comprising:

determining that a second virtual line of sight from a virtual location of a second user of a second mixed or virtual reality display device to the source material intersects the graphical representation of the operator; and based at least in part on the second virtual line of sight intersecting the graphical representation of the operator, displaying, via a second display of the second mixed or virtual reality display device, the first results of the at least one portion of the source material being modified by the operator.

8. The system as claim 7 recites, the operations further comprising:

determining that the second virtual line of sight from the second mixed or virtual reality display device to the presented source material intersects a second graphical representation of a second operator; and based at least in part on the second virtual line of sight intersecting the second graphical representation of the second operator, displaying, via the second display of the second mixed or virtual reality display device, third results of the at least one portion of the source material being modified by the second operator.

9. The system as claim 1 recites, wherein the source material comprises tabulated data.

10. The system as claim 1 recites, wherein the source material comprises real-time data from a measuring device.

11. A method comprising:

displaying source material via a display of a mixed or virtual reality display device;

displaying a graphical representation of an operator via the display of the mixed or virtual reality display device;

determining that a virtual line of sight from a virtual location of a user of the mixed or virtual reality display device to the source material intersects the graphical representation of the operator;

based at least in part on the virtual line of sight intersecting the graphical representation of the operator, displaying, via the display of the mixed or virtual reality display device, first results of at least one portion of the source material being modified by the operator;

displaying additional graphical representations of respective operators via the display of the mixed or virtual reality display device;

receiving real-time commands to direct at least one of positioning or ordering of the additional graphical representations of the respective operators to be located in new locations;

determining that the virtual line of sight to the source material intersects the additional graphical representations of the respective operators located in the new locations; and based, at least in part, on the virtual line of sight intersecting one or more of the additional graphical representations of the respective operators, displaying, via the display of the mixed or virtual reality display device, second results of the at least one portion of the source material being modified by one or more of the respective operators.

12. The method as claim 11 recites, wherein the first results of the at least one portion of the source material being modified by the operator is displayed in the graphical representation of the operator.

13. The method as claim 11 recites, wherein the operator is a mathematical operator, function, scaler, or graphical operator.

14. The method as claim 11 recites, further comprising, based at least in part on the virtual line of sight intersecting two or more of the additional graphical representations of the respective operators:

displaying, via the display of the mixed or virtual reality display device, the second results of the at least one portion of the source material being modified by a compound operator comprising two or more of the respective operators.

15. The method as claim 14 recites, wherein the positioning or ordering of the additional graphical representations of the respective operators affects the second results of the compound operator.

16. The method as claim 11 recites, wherein the mixed or virtual reality, display device is a first mixed or virtual reality display device, and further comprising:

determining that a second virtual line of sight from a virtual location of a second user of a second mixed or virtual reality display device to the source material intersects the graphical representation of the operator; and based, at least in part, on the second virtual line of sight intersecting the graphical representation of the operator, displaying, via a second display of the second mixed or virtual reality display device, the first results of the at least one portion of the source material being modified by the operator.

17. The method as claim 16 recites, further comprising:
determining that the second virtual line of sight from the second mixed or virtual reality display device to the presented source material intersects a second graphical representation of a second operator; and
based, at least in part, on the second virtual line of sight intersecting the second graphical representation of the second operator, displaying, via the second display of the second mixed or virtual reality display device, third results of the at least one portion of the source material being modified by the second operator.

18. A method comprising:
displaying data via a display of a mixed or virtual reality display device;
displaying a virtual optical system including a graphical representation corresponding to one or more mathematical or logical operators via the display of the mixed or virtual reality display device;
in response to an intersection of the virtual optical system with a virtual line of sight from a virtual location of a user of the mixed or virtual reality display device to the data, displaying, via the display of the mixed or virtual reality display device, first results of at least one portion of the data being modified by the one or more mathematical or logical operators;
displaying additional graphical representations of respective operators via the display of the mixed or virtual reality display device;
receiving real-time commands to direct at least one of positioning or ordering of the additional graphical representations of the respective operators to be located in new locations;
determining that the virtual line of sight to the source material intersects the additional graphical representations of the respective operators located in the new locations; and
based, at least in part, on the virtual line of sight intersecting one or more of the additional graphical representations of the respective operators, displaying, via the display of the mixed or virtual reality display device, second results of the at least one portion of the data being modified fey one or more of the respective operators.

* * * * *